United States Patent
Sanghvi et al.

(10) Patent No.: US 12,074,436 B2
(45) Date of Patent: Aug. 27, 2024

(54) CONTROLLING POWER TO A LOAD BASED ON SENSED ENVIRONMENTAL CONDITIONS

(71) Applicant: Leviton Manufacturing Co., Inc., Melville, NY (US)

(72) Inventors: Ankit Milan Sanghvi, Hicksville, NY (US); Michael Ross, Melville, NY (US)

(73) Assignee: LEVITON MANUFACTURING CO., INC., Melville, NY (US)

(*) Notice: Subject to any disclaimer, the term of this patent is extended or adjusted under 35 U.S.C. 154(b) by 101 days.

(21) Appl. No.: 17/647,359

(22) Filed: Jan. 7, 2022

(65) Prior Publication Data

US 2023/0223785 A1 Jul. 13, 2023

(51) Int. Cl.
G05D 22/00 (2006.01)
H02B 1/56 (2006.01)
H02J 13/00 (2006.01)

(52) U.S. Cl.
CPC ........ *H02J 13/00002* (2020.01); *G05D 22/00* (2013.01); *H02B 1/56* (2013.01); *H02J 13/00004* (2020.01); *H02J 13/0004* (2020.01)

(58) Field of Classification Search
CPC ............................ F24F 2110/20; G05D 22/00; H02J 13/00002; H02J 13/00003; H02J 13/00004
See application file for complete search history.

(56) References Cited

U.S. PATENT DOCUMENTS

| | | |
|---|---|---|
| 4,136,822 A | 1/1979 | Felter |
| 4,460,122 A | 7/1984 | Jardinier |
| 4,659,009 A | 4/1987 | Newell, III |
| 4,916,291 A | 4/1990 | Jan |
| 4,916,642 A | 4/1990 | Kaiser et al. |
| 4,942,364 A | 7/1990 | Nishijima et al. |
| 4,953,784 A | 9/1990 | Yasufuku et al. |
| 5,063,283 A | 11/1991 | Orazi |
| 5,082,173 A | 1/1992 | Poehlman et al. |
| 5,170,935 A | 12/1992 | Federspiel et al. |

(Continued)

FOREIGN PATENT DOCUMENTS

| | | |
|---|---|---|
| JP | H02161239 A | 6/1990 |
| JP | H07265646 A | 10/1995 |

(Continued)

OTHER PUBLICATIONS

Office Action issued in U.S. Appl. No. 17/322,990 on May 25, 2023, 64 pgs.

(Continued)

*Primary Examiner* — Benyam Haile
(74) *Attorney, Agent, or Firm* — Matthew M. Hulihan; Heslin, Rothenberg, Farley & Mesiti PC

(57) ABSTRACT

Electrical load controllers and methods for controlling conduction of electrical power to loads are provided that include determination of a baseline value based on a dynamic collection of past value(s), determination of a threshold humidity value as a function of a baseline humidity value and a second humidity value greater than the baseline humidity value and/or based on a received ambient light value, and/or determination of whether to transition a switching circuit to an ON state based on a current humidity value, other sensed environmental condition, baseline humidity value, and/or a threshold value.

39 Claims, 7 Drawing Sheets

(56) References Cited

U.S. PATENT DOCUMENTS

| | | |
|---|---|---|
| 5,228,306 A | 7/1993 | Shyu et al. |
| 5,232,152 A | 8/1993 | Tsang |
| 5,346,128 A | 9/1994 | Wacker |
| 5,365,154 A | 11/1994 | Schneider et al. |
| 5,450,893 A | 9/1995 | Galba et al. |
| 5,578,753 A | 11/1996 | Weiss et al. |
| 5,675,979 A | 10/1997 | Shah |
| 5,737,934 A | 4/1998 | Shah |
| 5,810,244 A | 9/1998 | Tanenbaum |
| 5,884,694 A | 3/1999 | Tanenbaum |
| 5,887,651 A | 3/1999 | Meyer |
| 6,204,623 B1 | 3/2001 | Levy et al. |
| 6,220,039 B1 | 4/2001 | Kensok et al. |
| 6,230,980 B1 | 5/2001 | Hudson |
| 6,557,771 B2 | 5/2003 | Shah |
| 6,570,139 B1 | 5/2003 | Levy et al. |
| 6,798,341 B1 | 9/2004 | Eckel et al. |
| 6,812,437 B2 | 11/2004 | Levy et al. |
| 6,920,874 B1 | 7/2005 | Siegel |
| 6,926,602 B1 | 8/2005 | Reese |
| 6,935,570 B2 | 8/2005 | Acker, Jr. |
| 6,958,010 B1 | 10/2005 | Reese |
| 6,960,745 B2 | 11/2005 | Levy et al. |
| 7,178,350 B2 | 2/2007 | Shah |
| 7,325,748 B2 | 2/2008 | Acker, Jr. |
| 7,339,471 B1 * | 3/2008 | Chan ................ H05B 47/11 315/159 |
| 7,632,178 B2 | 12/2009 | Meneely |
| 7,690,583 B2 | 4/2010 | Cherewatti et al. |
| 7,766,734 B2 | 8/2010 | Dietz et al. |
| 7,979,163 B2 | 7/2011 | Terlson et al. |
| 7,984,859 B2 | 7/2011 | Goodwin et al. |
| 8,118,236 B2 | 2/2012 | Lestage et al. |
| 8,214,085 B2 | 7/2012 | Boudreau et al. |
| 9,976,764 B2 | 5/2018 | Ostrovsky et al. |
| 11,015,831 B2 | 5/2021 | Ostrovsky et al. |
| 2004/0041036 A1 | 3/2004 | Acker, Jr. |
| 2005/0087612 A1 | 4/2005 | Fuller |
| 2005/0125083 A1 | 6/2005 | Kiko |
| 2005/0155362 A1 | 7/2005 | Shah |
| 2005/0252983 A1 | 11/2005 | Acker, Jr. |
| 2005/0257537 A1 | 11/2005 | Chang et al. |
| 2005/0269418 A1 | 12/2005 | Fuller |
| 2006/0154596 A1 | 7/2006 | Meneely |
| 2006/0213000 A1 | 9/2006 | Kimble et al. |
| 2006/0255164 A1 | 11/2006 | Oppermann et al. |
| 2006/0283963 A1 | 12/2006 | Fuller |
| 2006/0286922 A1 | 12/2006 | Roux et al. |
| 2007/0145158 A1 | 6/2007 | Dietz et al. |
| 2007/0197159 A1 | 8/2007 | Byczynski et al. |
| 2008/0011863 A1 | 1/2008 | Roux et al. |
| 2008/0143191 A1 | 6/2008 | Laser |
| 2008/0182506 A1 | 7/2008 | Jackson et al. |
| 2009/0057430 A1 | 3/2009 | Cherewatti et al. |
| 2009/0120631 A1 | 5/2009 | Chou et al. |
| 2009/0188984 A1 | 7/2009 | Al-Qassem |
| 2010/0006661 A1 | 1/2010 | Goodwin et al. |
| 2010/0024106 A1 | 2/2010 | Katsumi et al. |
| 2010/0078494 A1 | 4/2010 | Mularoni et al. |
| 2010/0105311 A1 | 4/2010 | Meneely, Jr. |
| 2010/0198411 A1 | 8/2010 | Wolfson |
| 2012/0048952 A1 | 3/2012 | Slingsby |
| 2012/0145802 A1 | 6/2012 | Peterson et al. |
| 2012/0228393 A1 | 9/2012 | Storm et al. |
| 2012/0234527 A1 | 9/2012 | Murayama et al. |
| 2013/0020397 A1 | 1/2013 | Branham et al. |
| 2016/0116343 A1 * | 4/2016 | Dixon ................ G05B 15/02 250/342 |
| 2018/0259211 A1 | 9/2018 | Ostrovsky et al. |
| 2020/0412070 A1 * | 12/2020 | Owen ................ H04L 43/16 |
| 2021/0278101 A1 | 9/2021 | Ostrovsky et al. |

FOREIGN PATENT DOCUMENTS

| | | |
|---|---|---|
| JP | H09222253 A | 8/1997 |
| JP | H1123027 A | 1/1999 |
| JP | H1123027 A | 1/1999 |
| JP | 2004290262 A | 10/2004 |

OTHER PUBLICATIONS

Dew Stop, Model FS-100 Humidity Sensing Fan Switch, Printed Dec. 3, 2013. 1 pg.

NuTone, Model QTXEN110S Humidity Sensor Fan Product Overview, Printed Aug. 2, 2013. 1 pg.

NuTone, Model QTXEN110S Humidity Sensor Fan Specification Sheet, Printed Aug. 2, 2013. 2 pgs.

Broan, Model QXTE110S Humidity Sensor Fan Manual, Printed Jun. 7, 2013. 8 pgs.

Broan, Model QXTE110S Humidity Sensor Fan Specification Sheet, Printed Jun. 7, 2013. 2 pgs.

Broan, Model MHS120L Sensaire® Humidity Sensing Bath Fan/Light/Night light Specification Sheet, Printed Jun. 7, 2013. Available at http://www.kitchensource.com/bathroom-fans/pdf/br-mhs1201_spec.pdf. 2 pgs.

Office Action in U.S. Appl. No. 14/289,285 dated Feb. 10, 2017, 25 pgs.

Office Action in U.S. Appl. No. 14/289,285 dated Aug. 10, 2017, 32 pgs.

Notice of Allowance in U.S. Appl. No. 14/289,285 dated Jan. 25, 2018, 7 pgs.

Office Action in U.S. Appl. No. 15/973,103 dated Nov. 5, 2019, 21 pgs.

Final Office Action in U.S. Appl. No. 15/973,103 dated Apr. 20, 2020, 20 pgs.

Office Action in U.S. Appl. No. 15/973,103 dated Aug. 5, 2020, 17 pgs.

Advisory Action in U.S. Appl. No. 15/973,103 dated Jul. 15, 2020, 13 pgs.

Notice of Allowance in U.S. Appl. No. 15/973,103 dated Feb. 19, 2021, 11 pgs.

* cited by examiner

CONTROLLING POWER TO A LOAD BASED ON SENSED ENVIRONMENTAL CONDITIONS

BACKGROUND

Ventilation mechanisms, such as ventilation fans (also referred to as exhaust fans), are typically used in bathrooms and other high humidity environments to manage or control the humidity and moisture levels that occur during and after a shower, bath or other high humidity event that increases the humidity in the environment. A ventilation mechanism can be controlled by "on" and "off" switches. Many such switches provide basic functionality and operate via manual switching (i.e. by a user), though more sophisticated switches will implement a countdown timer to automatically turn off the ventilation mechanism without further user intervention. Further, a humidity sensor may be used to facilitate automatic switching, in which the switch is automatically activated (turned on) based on a sensed humidity value in the environment.

SUMMARY

Shortcomings of the prior art are overcome and additional advantages are provided through the provision of a method for controlling conduction of a supply of electrical power to a load, the method including maintaining a dynamic collection of past humidity values received from a humidity sensor in the environment, wherein the dynamic collection of past humidity values changes based on passage of time and receipt of additional humidity values from the humidity sensor; determining a baseline humidity value based on identification of a lowest humidity value of the dynamic collection of past humidity values; receiving a current humidity value of the environment; determining, based on the current humidity value of the environment and the baseline humidity value, whether to transition a switching circuit from an OFF state, in which the switching circuit does not conduct the supply of electrical power to the load, to an ON state in which the switching circuit conducts the supply of electrical power to the load; and performing processing based on the determining whether to transition the switching circuit from the OFF state to the ON state.

Further, a method for controlling conduction of a supply of electrical power to a load is provided that includes determining a baseline humidity value based on at least one past humidity value received from a humidity sensor in the environment; determining a threshold humidity value as a function of the baseline humidity value and a second humidity value greater than the baseline humidity value; receiving a current humidity value of the environment; determining, based on the current humidity value and the determined threshold humidity value, whether to transition a switching circuit from an OFF state, in which the switching circuit does not conduct the supply of electrical power to the load, to an ON state in which the switching circuit conducts the supply of electrical power to the load; and performing processing based on the determining whether to transition the switching circuit from the OFF state to the ON state.

Yet further, a method for controlling conduction of a supply of electrical power to a load is provided that include receiving, from an ambient light-sensing element in the environment, an ambient light value indicating a level of ambient light in the environment; receiving, from a sensor in the environment, a sensed environmental condition of the environment; determining a threshold value based on the received ambient light value; determining, based on the sensed environmental condition and the determined threshold value, whether to transition a switching circuit from an OFF state, in which the switching circuit does not conduct the supply of electrical power to the load, to an ON state in which the switching circuit conducts the supply of electrical power to the load; and performing processing based on the determining whether to transition the switching circuit from the OFF state to the ON state.

In addition, electrical load controllers for controlling conduction of a supply of electrical power to a load are provided in which the electrical load controllers include a line input terminal and a load output terminal, the line input terminal configured to be electrically coupled to the supply of electrical power, and the load output terminal configured to be electrically coupled to the load, a switching circuit electrically coupled in series between the line input terminal and the load output terminal, the switching circuit having an ON state in which the switching circuit conducts the supply of electrical power to the load, and an OFF state in which the switching circuit does not conduct the supply of electrical power to the load, and a microcontroller that is configured to perform methods/processes set forth above and herein.

Further provided are electrical load controllers for controlling conduction of a supply of electrical power to a load. An electrical load controller can include a line input terminal and a load output terminal, the line input terminal configured to be electrically coupled to the supply of electrical power, and the load output terminal configured to be electrically coupled to the load, and a switching circuit electrically coupled in series between the line input terminal and the load output terminal, the switching circuit having an ON state in which the switching circuit conducts the supply of electrical power to the load, and an OFF state in which the switching circuit does not conduct the supply of electrical power to the load. The load controller can also include a microcontroller configured to perform methods described herein, for instance the aforementioned methods and others.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
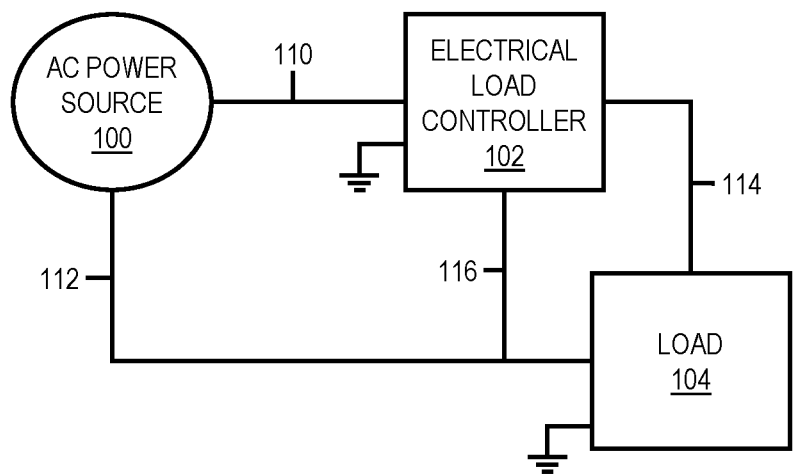
FIG. 1 depicts an example load control system in which an electrical load controller controls a supply of electrical power to a load.

Described herein are approaches for load control based on sensed environmental conditions. Examples are presented in the context of ventilation mechanisms (loads) for ventilating an environment to decrease humidity of the environment. The environmental condition may be relative humidity (RH) in the environment, and the RH can be sensed as humidity values by a humidity sensor of the environment. In examples, the humidity sensor is provided as part of an electrical load controller, for instance one that incorporates a switch to switch ON and OFF the electrical power to the ventilation mechanism, though in other examples the humidity sensor is provided remote from the electrical load controller and is in wired or wireless communication with one or more devices (which may or may not include the load controller) to provide sensed humidity values of the environment. Additionally, example loads can incorporate a ventilation mechanism together with other components, for instance a light.

Humidity-based triggering switching ON electrical power supply to a load is provided in some aspects using windowing humidity-based automatic triggering, proportional threshold-based automatic triggering, and/or ambient-light sensing to control automatic triggering, as described herein.

As context for aspects described herein, many countries have an electric grid infrastructure that uses alternating current ("AC") as a power source (referred to herein as an "AC source") for supplying AC power. These systems can be either balanced or unbalanced and may include a phase line ("phase conductive path") and a return path (usually referred to as a "neutral" line or "neutral conductive path"). The "neutral" conductive path can be used as a return path for the AC source supplied by a phase conductive path. A conductive path can also be referred to as a "wire". The terms "conductive path", "conductor", and "wire" are considered herein to be synonymous. For safety reasons, the neutral wire is typically grounded at some juncture, for instance the main electrical panel. Although a ground wire is typically present at all electrical boxes, a neutral wire may or may not be present in some electrical boxes, such as some switch was boxes used to control a load. In such instances where the neutral wire is absent, the electrical/wall box typically contains a phase wire, a load wire, and a ground wire (or ground connection via a metal sheath of the electrical cable). As such, the load is to be controlled by a device referred to as a "two-wire device" (examples of which are a switch or a dimmer), where the phrase "two-wire" refers to the phase wire and the load wire (e.g. the absence of a neutral wire), though a two-wire device does not exclude the possibility of the device being connected to a third, ground wire. In contrast, "three-wire" devices typically refer to devices configured to connect to a phase wire, a neutral wire, and a load wire (in addition to ground). Aspects described herein can apply to both two-wire and three-wire devices.

Many dwellings and office buildings use either a single or multi-phase AC source and/or some combination thereof. The AC source may be accessed by standardized connections, referred to as "plugs", that prevent a user from improperly connecting to an AC source, e.g., a three-phase AC plug cannot connect to a two-phase AC outlet. Additionally, many AC sources may selectively apply electricity to a load based upon whether a switch is turned on or off, e.g., a light switch.

FIG. 1 depicts an example load control system in which an electrical load controller controls a supply of electrical power to a load. The system includes AC power source 100, electrical load controller 102, and load 104. AC electrical power is supplied by AC source 100 to the electrical load controller 102 via phase conductive path 112 (also referred to as "hot" or "line"), which is electrically coupled to load 104 via load wire or conductive path 114 and then to AC source 100 via neutral conductive path 112. The electrical load controller 102 has a direct connection to neutral via line 116, for instance to enable the electrical load controller to remain continuously powered even when a switching circuit to conducting electrical power to the load is in the OFF/open state.

The electrical load controller 102 controls delivery of electrical power to the load 104 by way of a switching circuit. The electrical load controller can include digital control electronics and code for execution to perform various aspects, including aspects described herein to operate a power switching circuit of the load controller 102 and regulate delivery of power to the load. The switching circuit can transition between an OFF state, in which the switching circuit of the load controller 102 does not conduct the supply of electrical power to the load 104, and an ON state in which the switching circuit conducts the supply of electrical power to the load 104. The switching of the switching circuit can be controlled by the digital control electronics, for instance signal(s) provided to the switching circuit to control a state (e.g. ON or OFF) of the switching circuit. The digital control electronics and/or code can be implemented via one or more processor, microprocessor, controller, microcontroller, processing circuit, or the like (which are referred to herein collectively as "microcontroller" or "processor").

The load controller 102 can be coupled to or include one or more user-accessible actuators (not pictured) that a user may be able to engage or otherwise interface with to provide command information, which the load controller 202 receives and interprets as a command or a set of commands to perform one or more actions or configure settings for or relating to controlling operation of the load controller and therefore controlling the delivery of electrical power to the load 104.

In this manner, the load controller 102 can control, for example, the supply of electrical power to the load 104 by tailoring the parameters used by the microcontroller for activating the switching circuit (i.e. transitioning the switching circuit to an ON position or OFF position). An example switching circuit is a Triode for Alternating Current (TRIAC) switching element, though other switching circuits are possible, for instance Silicon-controlled Rectifiers (SCRs), or Metal-Oxide-Semiconductor Field-Effect Transistors (MOSFETs), as examples.

Optionally, the load controller 102 can incorporate dimming functions that control current provided to the load 104, for instance to control fan speed or brightness of a light of the load.

The electrical load controller 102 can receive sensed environmental conditions, for instance humidity values/levels in an environment. An example sensor is a humidity sensor to sense humidity levels/values in a surrounding environment. Another example sensor is an ambient light-sensing element that senses level of ambient light in the environment. In any case, sensor(s) can be provided as part of the load controller 102 installed in the environment and/or can be located remote from the load controller and communicatively coupled (directly or indirectly through other system(s)) to the load controller 102 via wired or wireless connection(s) to provide sensed values to the load controller.

In some aspects, windowing humidity-based automatic triggering is provided. In order to detect an increase in humidity, such as an increase caused by a shower turning on, it is useful to establish a baseline humidity level. The baseline can then be used in determining whether to switch ON a ventilation mechanism load (i.e. transition the switching circuit from an OFF state to an ON state thereof). Aspects utilize a moving/sliding window approach to buffer past humidity values, and determine the baseline at any given time from the values existing in the window at that time. The window is a dynamic collection of past humidity values received from humidity sensor(s) in the environment. The dynamic collection of past humidity values is dynamic in that it changes based on passage of time and receipt of additional humidity values from the humidity sensor. In a specific example, the load controller is configured to maintain in the dynamic collection a defined time-period (amount of time, such as 5 minutes) of prior humidity values and the baseline that is determined at a given point in time is based on the humidity values that exist within the dynamic collection at that point in time.

Figure 2:
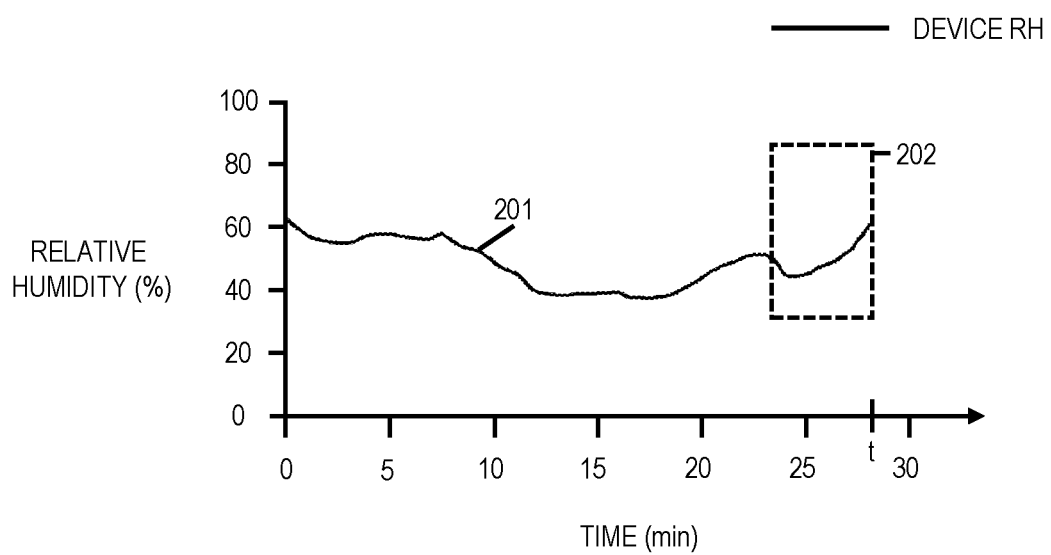
FIG. 2 illustrates an example of windowing past humidity values to facilitate switching power to a load, in accordance with aspects described herein.

FIG. 2 illustrates an example of windowing past humidity values to facilitate switching power to a load, in accordance with aspects described herein. In this example, humidity values in the environment (e.g. a bathroom or other space) are periodically sampled by a humidity sensor, for instance every 5 seconds. FIG. 2 shows a plot 201 of these humidity values over approximately 28 minutes starting at time 0. Relative humidity as measured by the device (e.g. a sensor) varies during this time between about 60% and about 40%.

The dynamic collection of past humidity readings may be conceptually considered as a buffer that, at any given time, can be represented as a 'window' of time/humidity values. In FIG. 2, the window 202 is positioned such that it ends at the current point in time, time t at approximately 28 minutes. The window is 5 minutes in duration in this example, extends from approximately the 23-minute mark to the current time, t, at the approximate 28-minute mark, and includes the humidity values sensed in the most recent past 5 minutes.

The dynamic collection could therefore be defined to include a set of most recently received past humidity values sensed by the humidity sensor in the environment. The set could be defined by a set duration of time, as in the example of FIG. 2, where the dynamic collection includes only the past humidity values received within a defined window of time ending at a current time. In the example of FIG. 2, the defined window of time is the last 5 minutes. Alternatively, the set could be defined to include a predefined number of most recently received past humidity values to maintain in the dynamic collection, for instance 64 values. Other examples for defining the bounds of the dynamic collection are possible.

It is noted that when sensing first begins, it will take time for the dynamic collection to fill to its capacity. The number of humidity values in the dynamic collection increases until the defined amount of time has lapsed or the defined number of most recently received past humidity values is received. Therefore, the dynamic collection includes a number of values equal to or less than the capacity defined by the defined window of time or defined number of values for the collection to hold.

Regardless whether the dynamic collection includes a maximum number of values or includes all values within a window of time, the dynamic window changes in terms of the values included and timings at which those values are taken, and therefore changes based on both passage of time and receipt of additional values.

The dynamic window of past humidity values can be used in determining a baseline humidity value against which humidity increases are judged. Humidity increases can inform triggering events to switch ON the switching circuit of an electrical load controller. The baseline can be determined based on identifying the lowest humidity value(s) of the dynamic collection, for instance. In some examples, the baseline is determined as the absolute minimum (the '1st' lowest) humidity value of the dynamic collection, though in other examples is determined as the nth-lowest humidity value where n>1, as described below. The baseline can be used in any of various ways to judge a humidity increase and therefore help determine whether to not to transition the switching circuit, for instance from OFF to ON to power the load. Accordingly, a process can receive a current humidity value of the environment, determine, based on the current humidity value of the environment and the baseline humidity value, whether to transition the switching circuit from the OFF state (in which the switching circuit does not conduct the supply of electrical power to the load) or any other existing state, to the ON state in which the switching circuit conducts the supply of electrical power to the load, and then perform processing based on that determination whether to transition the switching circuit from the OFF state to the ON state. If it is determined to transition the switching circuit to the ON state, the processing could the microcontroller or other component activating the switching circuit to close the switch by, for instance, providing a control pulse to the switching circuit. If it is instead determined not to transition the switching circuit to the ON state, but instead to maintain it in the OFF state for instance, then the processing could be to proceed to a next step, for instance to iterate on a loop that monitors for a next incoming humidity value. The received current humidity value could, in any case, be included in the dynamic collection as a next humidity value. This may cause a discard of the oldest value in the collection, depending on how the window is defined.

As one example of the use of the baseline humidity value, a comparison could be made between the current humidity value and the baseline humidity value, and the switch activated (to turn ON) if the difference exceeds some threshold difference. Similarly, a threshold humidity value could be determined based on that baseline, and the current humidity value can be compared to that threshold to determine whether to transition from the OFF state to the ON state. If the current humidity value exceeds (or optionally is equal to) the threshold, then it can be determined to transition to the ON state. The threshold could in this example be set to some number higher than the baseline humidity value, for instance a fixed number greater than the baseline or a fixed percentage greater than the baseline.

As another example, the threshold could be set based on the baseline humidity value, and specifically based on a difference between the baseline humidity value and a second humidity value greater than the baseline humidity value, for instance a saturation humidity (100% RH). The threshold humidity value could be set equal to the baseline humidity value plus a proportion of the difference between the baseline humidity value and the second humidity value, for example, as is described in further detail below.

In any case, the baseline can be determined from the dynamic collection of past humidity values in any of varying ways. As noted, the baseline could be determined as an nth-minimum past humidity value of the dynamic collection of past humidity values, where the nth-minimum past humidity value is the nth-lowest unique humidity indicated by the dynamic collection of past humidity values, and the baseline humidity value is taken as the determined nth-minimum. When n=1, the nth minimum is the $1^{st}$ minimum which is the lowest humidity indicated by the dynamic collection. By way of specific example in which the dynamic collection includes the following 7 humidity levels (in % RH) sampled in this order: {30, 20, 10, 10, 20, 50, 70}, the lowest humidity indicated is 10%, and two humidity values (the $3^{rd}$ and $4^{th}$ sampled values) reflect that humidity.

In an effort to disregard potential outliers, the nth-minimum used for the baseline could be other than absolute minimum (1st-minimum), and instead take the 2nd, 3rd, 4th, etc. minimum as the 'minimum' for purposes of determining the baseline. When n is greater than or equal to 2, there are n−1 lower unique humidities (one or more) indicated by the dynamic collection of past humidity values. Using the example above, there are 5 unique humidities—10%, 20%, 30%, 50%, 75%—indicated by the dynamic collection despite there being 7 total readings in the collection. The $2^{nd}$-minimum (n=2) is 20% and therefore there is (2−1=1) lower unique humidity, i.e. 10%. The $4^{th}$ minimum (n=4) is 50% and therefore there are (4−1=3) lower humidities, i.e. 10%, 20%, 30% indicated by the collection.

In this manner, the baseline may be determined in some aspects using the values in the collection, specifically determining which are lower value(s) in the dynamic collection, for instance by comparing the values to each other to identify which are the lowest. All of the values may be candidates for use in determining the baseline, but the value(s) actually used may be ascertained based on this identification of the lowest value(s).

The baseline may be redetermined periodically or aperiodically. In examples, it is redetermined based on a change to the dynamic collection of past humidity values. For instance, the change can include discarding from the dynamic collection of past humidity values a past humidity value equal to the baseline humidity value. If the baseline is set to the nth-minimum of the dynamic collection and the humidity value discarded from the collection (e.g. by aging out and/or being pushed out by a more recent reading) matches the current baseline, then the nth-minimum of the collection may have changed and therefore the baseline can be redetermined by, for instance, searching the dynamic collection to determine the new nth-minimum. The change to the dynamic collection could include receiving for inclusion in the collection a next humidity value (for instance a current humidity value just sensed) that may or may not be smaller than the current baseline humidity value. In this case, if the received next humidity value is less than the baseline, then the baseline can be redetermined, as the next humidity value might be the new nth-minimum of the dynamic collection.

Alternatively, the baseline humidity value could be determined as a function of n unique humidities indicated by the dynamic collection, where n>1. An example such function is an average, and optionally a weighted average. The n unique humidities could be n lowest unique humidities indicated by the dynamic collection, including at least, for example, the absolute ($1^{st}$) minimum and second lowest ($2^{nd}$-minimum). In the example above in which the dynamic collection includes the values {30, 20, 10, 10, 20, 50, 70} and the baseline is taken as the average of the 3 lowest unique humidities—10%, 20% and 30%—then the average is 20% (it is coincidental that 20% happens to a humidity value indicated in the dynamic collection).

In a specific implementation in which the baseline is taken as an nth-minimum of the collection and there is a threshold (possibly based on the baseline as explained in other aspects herein), where exceeding the threshold causes the switch to transition to ON, then a process can proceed as follows:
1. Set k=1;
2. Identify kth-minimum;
3. Determine threshold if not already determined (i.e. possibly based on the kth-minimum value);
4. Compare the newly received humidity level (the current humidity level) to the threshold.
5. If the current humidity level does not exceed the threshold, determine not to transition the switching circuit to the ON state and break.
6. If k==n, determine to transition the switching circuit to the ON state and break.
7. If the current humidity level exceeds the threshold, set k=k+1 and loop back to step 2.

In accordance with the above, the process iteratively compares (at step 4) the new humidity value to a threshold (possibly set based on the current baseline/kth-minimum in the window), and loops on this (via step 7) until the threshold is not exceeded (determined at step 5) or until the nth-minimum is reached and the threshold is still exceeded (determined step 6), at which point it makes the determination whether to transition to the ON state (no at step 5, yes at step 6).

Proportional threshold-based automatic triggering may additionally or alternatively be provided in accordance with aspects discussed herein. In any situation where a threshold is used in determining whether to switch ON a switching circuit to provide electrical power to a load, the threshold may be determined as a function of at least a baseline value, and potentially a second value that is greater than the baseline value. Using the examples of humidity-based switching, the switching threshold could be determined as a function of a baseline humidity value and a second humidity value that is greater than the baseline humidity value. The function can be selected so that the triggering threshold automatically scales based on the baseline humidity level, rather than the threshold being a fixed value.

For instance, the function can include a proportion of a difference between the baseline humidity value and the second humidity value. In this case, the threshold humidity value can be set equal to the baseline humidity value plus the proportion of the difference between the baseline humidity value and the second humidity value. The second humidity value could be any humidity level greater than the baseline. In some examples, the second humidity value a saturation humidity of air in the environment, for instance 100% relative humidity. The proportion can be any proportion (e.g. percentage) of the difference). In particular examples, the proportion is between 25% and 75%. In a specific example, the proportion is 50% such that the determined threshold humidity value is the midpoint between the baseline humidity value and the second humidity value.

In setting the threshold in this manner, the lower the baseline humidity value the larger the difference is between the baseline humidity value and second humidity value (e.g. 100%) as well as between the baseline humidity value and the selected threshold as the threshold is a function the proportion (e.g. 50%) of the difference between the baseline and second humidity values. Consequently, a greater increase in humidity relative to the baseline is needed to reach the threshold and trigger the switching ON of the device than if the baseline humidity value were higher. It follows that the higher the baseline, the smaller the difference is between the baseline and the second humidity value, the proportion (e.g. 50%) of that difference is a lower value, and therefore the threshold will be set at a smaller distance from the baseline when using the function above. Using the proportion of the different to set the threshold means that the distance between the baseline and the determined threshold decreases as the baseline increases.

By using proportional threshold determination, this allows the load controller to function (i.e. to switch ON at some point) regardless of the baseline humidity level. For instance, if the threshold is always set to be a fixed value (say 30%) above the baseline, then a sufficiently high baseline (say 71%) would result in the load controller never switching ON because the threshold would be above 100% RH. Using instead a proportion of the difference as discussed herein to set the threshold means that there will always be a threshold between the baseline humidity value and the second humidity value (for instance 100%) and therefore at some point the load controller can activate to dehumidify the environment.

If at some point the baseline humidity value changes (for instance based on a dynamic collection approach discussed above) a process can redetermine the appropriate threshold humidity value to use.

The baseline can be determined using any desired approach. In examples, it is determined based on at least one past humidity value. In yet further examples, it is determined using an approach described above based on a dynamic collection of past humidity values received from a humidity sensor. The baseline humidity value could be determined as an nth-minimum past humidity value of the dynamic collection of past humidity values in which the nth-minimum past humidity value is the nth-lowest unique humidity indicated by the dynamic collection of past humidity values. In specific embodiments, n is greater than or equal to 2.

Figure 3A:
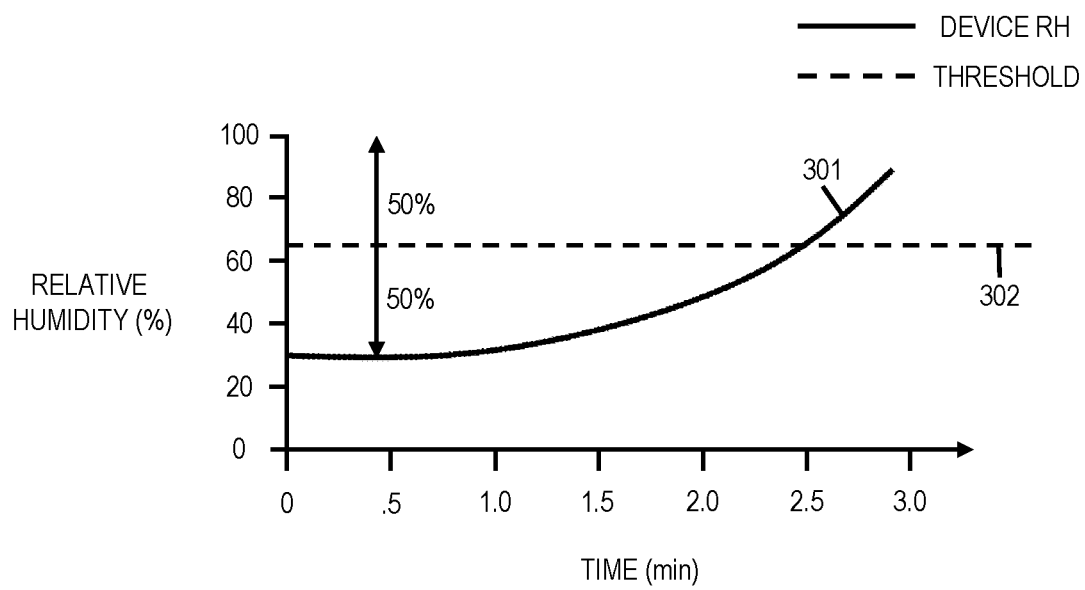
FIGS. 3A-3B illustrates examples of proportional switching threshold determination to facilitate switching power to a load, in accordance with aspects described herein.
Figure 3B:
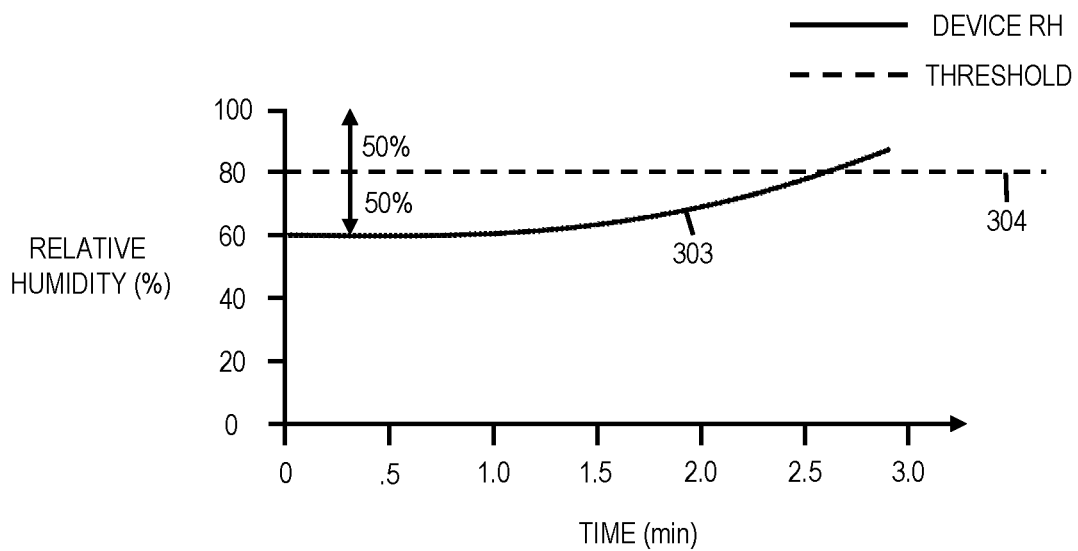

To illustrate aspects of proportional switching threshold determination to facilitate switching power to a load, refer to the examples of FIG. 3A-3B. In both examples, the proportion on which the threshold is based is set to 50%.

FIG. 3A shows a plot 301 of sensed humidity values over approximately 3 minutes starting at time 0. The plot 301 shows that relative humidity in the environment trends upward across this timeframe. Using any desired approach based on one or more past humidity values, the baseline is determined as 30%. The baseline may be determined as second-minimum of a dynamic collection of humidity values, for instance.

The switching threshold is determined as a function of a difference between this baseline humidity value (30%) and a second humidity value, 100% in this example. This difference is 70% humidity. Further, the threshold is determined based on a proportion—50%—of that difference. The proportion of that difference is 35% humidity, and the threshold is set equal to the baseline humidity value (30%) plus the proportion (50%) of the difference (70%) between the baseline humidity value (30%) and the second humidity value (100%). In other words, the threshold is set at 30%+(0.5*70%)=65% RH. Dashed line 302 in FIG. 3A represents this threshold. Assuming a determination is made to switch ON when the current humidity value in the environment reaches the threshold, then a process will determine to switch ON at approximately t=2.5 in this example.

FIG. 3B shows an example in which the baseline humidity value is higher than that of FIG. 3A. Plot 303 shows, as in FIG. 3A, sensed humidity values over approximately 3 minutes starting at time 0. Using the desired approach, the baseline is determined as 60% in this example based on one or more past humidity values. The difference between this baseline (60%) and the second humidity (100%) is 40%, and the selected proportion (50%) of that difference (40%) is 20%. The switching threshold is therefore determined as 60%+20%=80% in the example of FIG. 3B. Dashed line 304 in FIG. 3B represents this threshold.

FIGS. 3A, 3B show that use of fixed function involving a dynamic value (baseline) to determine the threshold scales the threshold with the baseline humidity value to effectively scale a sensitivity of the load controller in terms of switching ON based on humidity changes. The load controller is less sensitive to humidity increases when the baseline is lower (e.g. 35% increase in humidity relative to the baseline is needed to trigger the switch when the baseline is 30%) as compared to when the baseline is higher (i.e. 20% increase in humidity relative to the baseline is needed to trigger the switch when the baseline is 60%).

In accordance with aspects described herein, a process can determine the baseline humidity value, determine the threshold humidity value used for switch transition determination, receive a current humidity value of the environment, and determine, based on the current humidity value and the determined threshold humidity value, whether to transition the switching circuit to the ON state to conduct electrical power to the load. The process can then perform further processing based on that determination, e.g. either signal the switching circuit to switch or proceed to a different next step.

Ambient-light (or other environmental condition) sensing to control automatic triggering may additionally or alternatively be provided in accordance with aspects discussed herein. Ambient light in an environment can be an indicator of occupancy, and light-based occupancy sensing can be used to reduce false triggering events—events when a switching circuit is undesirably transitioned to an ON state even if a sensed environmental condition might otherwise justify powering the load.

For an electrical load controller that does not control a primary lighting load in an environment and that senses some phenomenon/environmental condition (such as humidity) in the environment, ambient light in the area can be used to reduce the rate of false positive events (such as a sufficient increase in humidity) that might otherwise cause the load controller to transition the switch to the ON state. A false positive may be taken as such based on an assumption that the primary lighting load (which increases ambient light in the environment) would always be on when the space is in use and warrants switching ON the load (a ventilation mechanism in these examples). The presence or absence of that ambient light can be used as an indicator whether the space is occupied. If not occupied, processing of the load controller can determine not to switch to the ON state, or at least decrease the sensitivity of the load controller to switching to the ON state. When an ambient light value indicating a level of ambient light in the environment is sufficiently low that it indicates the environment is likely not occupied, the load controller may be configured not to switch at all or a switching threshold upon which determinations whether to transition to the ON state are determined can be set at a first level. When the ambient light value is sufficiently high that it indicates the environment is (likely) occupied, the switching threshold upon which determinations whether to transition to the ON state are determined can be set at a second level that is lower than the first level. In this manner, there may be two (or more) candidate thresholds for switching to the ON state, where one it selected at any given time based on the ambient light value at the time. The different thresholds correspond to different sensitivities for triggering.

Figure 4:
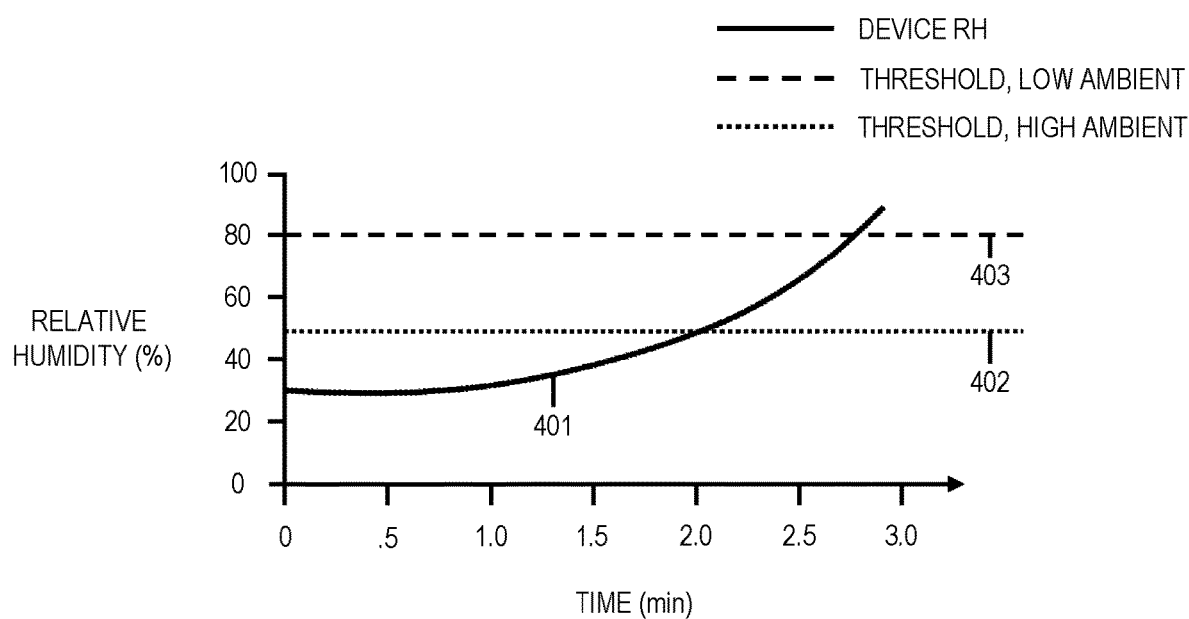
FIG. 4 illustrates an example of switching threshold determination based on a sensed environmental condition, in accordance with aspects described herein.

FIG. 4 illustrates an example of switching threshold determination based on a sensed environmental condition, in accordance with aspects described herein. In this example, the sensed environmental condition is humidity. FIG. 4 shows a plot 401 of sensed humidity values over approximately 3 minutes starting at time 0. As described elsewhere herein, the load controller can be configured to transition the switching circuit between states based on a threshold. For instance, a threshold value could correspond to a point at which the switching circuit is closed to enter an ON state and provide electrical power to a load, based on a current sensed environmental condition (such as humidity) reaching that point.

In accordance with these aspects, a threshold value is determined based on an ambient light value that is received from an ambient light-sensing element in the environment and indicates a current level of ambient light in the environment. In the example of FIG. 4, there are two thresholds available for selection depending on ambient light value. If the ambient light value is 'low' (defined using any desired approach, for instance an ambient threshold value below which is considered 'low' ambient light and above which is considered 'high' ambient light), then a first threshold level is used. In instead the ambient light value is 'high', a second threshold level is used. In this example, the first threshold is higher than the second threshold. This means that if the received ambient light value indicates that ambient light in the environment is brighter than some ambient light threshold ('high' ambient), then the switching threshold value (402) is selected to be relatively low, it is therefore easier for a change in the sensed environmental condition (e.g. rise in humidity) to meet the switching threshold, and consequently the load controller is made more sensitive to increases in the sensed environmental condition (e.g. humidity) in terms of determining to switch. Conversely, if the received ambient light value indicates that ambient light in the environment is lower than the ambient light threshold ('low' ambient), then the switching threshold value is selected to be relatively high (403), it is therefore more difficult for a change in the sensed environmental condition (e.g. rise in humidity) to meet the switching threshold, and consequently the load controller is made less sensitive to increases in the sensed environmental condition (e.g. humidity) in terms of determining to switch.

Threshold selection based on sensed ambient light can help reduce rate of false positives in terms of switching ON the load. This can be useful in situations of showers and other humidity-increasing events that typically take place in illuminated areas. A relatively dim bathroom, for instance, is unlikely to be occupied by a human and therefore it may be desired to prevent the load from operating altogether by refraining from switching ON power to it, or by changing the threshold to make it more difficult to meet the threshold at which the load is to be switched ON.

As noted, a 'not occupied' state of sufficiently dim ambient lighting may correspond to a lower sensitivity and therefore make it harder to trigger switching ON power to the load, while ambient light above a threshold can indicate occupancy and therefore a higher sensitivity (lower threshold) to make it easier to trigger switching ON the power to the load. A corresponding two thresholds could therefore be used as in the example of FIG. 4. As an alternative to discrete sensitivity levels, sensitivity, by way of selection of an appropriate threshold, could scale depending on ambient light value. For instance, the threshold value could be determined as a continuous function of the received ambient light value.

Thus, an example process, for instance one performed by a load controller, receives, from an ambient light-sensing element in the environment, an ambient light value indicating a level of ambient light in the environment, receives, from a sensor in the environment, a sensed environmental condition of the environment (such as relative humidity therein), determines a threshold value based on the received ambient light value, and determines, based on the sensed environmental condition and the determined threshold value, whether to transition a switching circuit from an OFF state to an ON state in which the switching circuit conducts the supply of electrical power to the load.

In some examples, the threshold value is determined as (i) a first value based on the received ambient light value indicating that ambient light in the environment is brighter than an ambient light threshold, or (ii) a second value, greater than the first value, based on the received ambient light value indicating that ambient light in the environment is darker than the ambient light threshold. Alternatively, the threshold value is determined as a continuous function of the received ambient light value.

As yet another option, if the received ambient light value exceeds some ambient light threshold, the determined switching threshold can indicate that the switching circuit is not to be automatically transitioned to the ON state. For instance the threshold is set to a null or undefined value, or another value taken as an indication that switching ON the power to the load is currently disabled.

As noted, the environmental condition could be relative humidity and therefore the sensed environmental condition could be a current humidity value of the environment, where the threshold value is therefore a switching threshold humidity value.

Ambient-light based threshold determination can incorporate other aspects described herein, such as proportional threshold setting and/or baseline determination using a dynamic collection of past humidity values. For instance, determining the threshold humidity value can include a selection among different available threshold levels depending on the ambient light in the environment. Different ambient light values could correspond to different functions for determining a threshold. In examples, the threshold determination could include determining a baseline humidity value based on at least one past humidity value received from a humidity sensor in the environment and the threshold humidity value can be determined also as a function of the baseline humidity value. The threshold humidity value could be determined as a function of the baseline humidity value and a second humidity value greater than the baseline humidity value, where the function includes a proportion of a difference between the baseline humidity value and the second humidity value. The threshold humidity value could be set equal to the baseline humidity value plus the proportion of the difference between the baseline humidity value and the second humidity value, for instance. In embodiments, the particular proportion used could be selected based on the current ambient light value indicating the level of ambient light in the environment at that time. In this manner, the ambient light value influences the determination of the threshold to use by determining the proportion to use in proportional threshold setting.

Additionally or alternatively, a dynamic collection of past humidity values received from a humidity sensor can be used for baseline determination, where that dynamic collection of past humidity values changes based on passage of time and receipt of additional humidity values from the humidity sensor. Determining the baseline humidity value could determine an nth-minimum past humidity value of the dynamic collection of past humidity values, the nth-minimum past humidity value being the nth-lowest unique humidity indicated by the dynamic collection of past humidity values, wherein the determined baseline humidity value is taken as the determined nth-minimum. N could be greater than or equal to 2 in examples. In this manner, the determination whether to switch to the ON state can be a function of a baseline humidity value determined from a dynamic collection of past humidity values and/or a threshold determined based on ambient light value (which threshold determination may or may not itself be based on the baseline determination).

Accordingly, electrical load controllers, and processes of operation of such electrical load controllers, for controlling conduction of a supply of electrical power to a load are described herein. Such processes can be performed by one or more apparatuses, such as electrical load controllers as described herein for controlling conduction of a supply of AC power to an electrical load. The load could be or include a ventilation mechanism, such as a ventilation fan. The electrical load controller can include a line input terminal and a load output terminal, the line input terminal configured to be electrically coupled to the supply of electrical power, and the load output terminal configured to be electrically coupled to the load. The electrical load controller can further include a switching circuit electrically coupled in series between the line input terminal and the load output terminal, and have an ON state in which the switching circuit conducts the supply of electrical power to the load and an OFF state in which the switching circuit does not conduct the supply of electrical power to the load. The switching circuit can be configured to be selectively controlled by varying a control signal between an ON state, in which the switching circuit conducts the supply of AC power to the load, and an OFF state. The electrical load controller can further include other components, such as sensor(s) configured to sense one or more environmental conditions, such as humidity and/or level of ambient light in the environment. The electrical load controller can further include a microcontroller or other processor/processing circuit to perform aspects of processes described herein. The microcontroller can be configured to execute program instructions, for instance, to cause the electrical load controller to perform, and/or initiate performance by other components of, actions such as transitioning a switching circuit to one state (such as ON) from another state (such as OFF). In examples, the microcontroller executes program code to perform a process for operating an electrical load controller to control conduction of a supply of electrical power (such as AC power) to a load. Example such processes are those described with reference to FIGS. 5-9

FIGS. 5-9 depicts example processes for operating an electrical load controller to control conduction of a supply of electrical power to a load, in accordance with aspects described herein. The control may be based in part on sensed humidity readings in an environment. The load can be or include a ventilation mechanism to dehumidify the environment. In some examples, aspects of the processes are performed by the electrical load controller itself that includes a switching circuit, though in other examples some or all aspects are performed by one or more computer systems in communication with an electrical load controller with a switching circuit. In this regard, a remote system could act as a controller of an electrical load by performing processing described herein and communicating with another device (such as a wall box electrical load controller with a switching circuit) to provide commands that control the switching ON or OFF of the switching circuit and thereby control the supply of power to the load.

Figure 5:
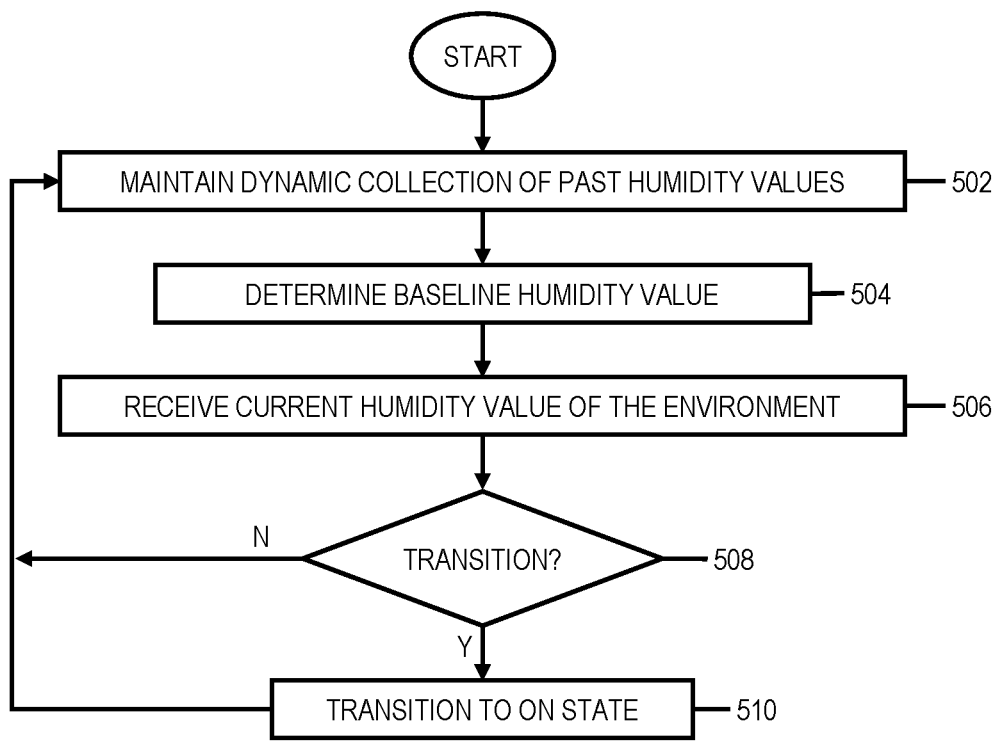
FIGS. 5-9 depict example processes for controlling conduction of a supply of electrical power to a load, in accordance with aspects described herein.

Referring to FIG. 5, which depicts an example process for controlling conduction of a supply of electrical power to a load based on sensed humidity readings in an environment. The process includes maintaining (502) a dynamic collection of past humidity values. The past humidity values can be received from a humidity sensor in the environment. The dynamic collection of past humidity values changes in that the particular humidity values included in the collection change based on passage of time and receipt of additional humidity values from the humidity sensor. For instance, older values can age out and newer values can be added as they are received.

The dynamic collection of past humidity values can include, for instance, a set of most recently received past humidity values sensed by the humidity sensor in the environment. The set of most recently received past humidity values sensed by the humidity sensor can include, as examples, (i) at most a predefined number of most recently received past humidity values to maintain in the dynamic collection, and/or (ii) only past humidity values received within a defined window of time ending at a current time.

The process continues by determining (504) a baseline humidity value based on identification of a lowest humidity value of the dynamic collection of past humidity values. An example process for determining a baseline humidity value is presented in FIG. 6.

Figure 6:
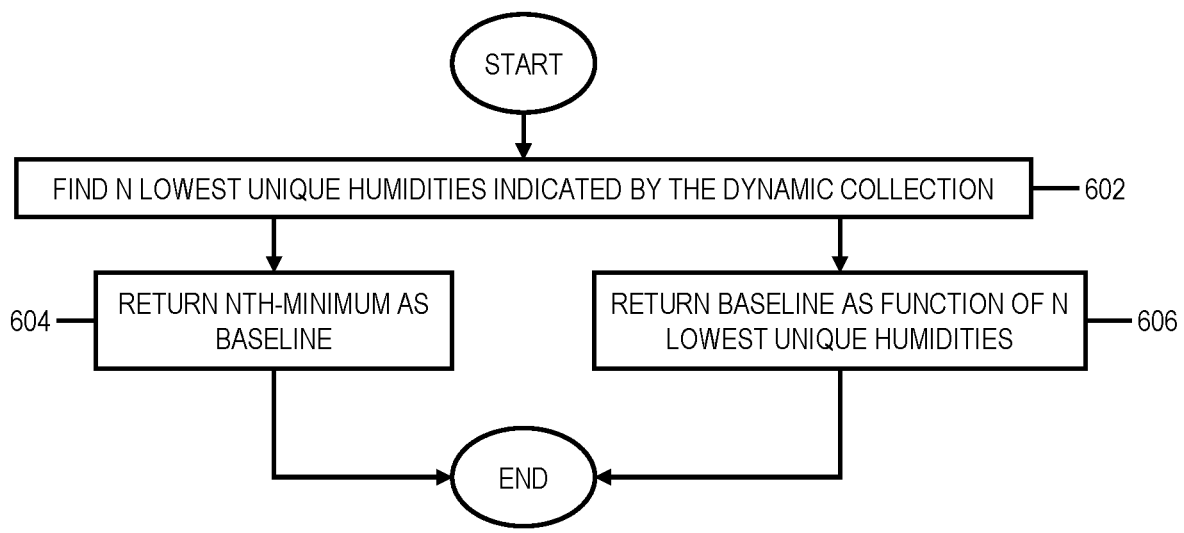

Referring to FIG. 6, in general the process can determine through comparison or another approach the lowest humidity values in the dynamic collection. This includes the absolute minimum as well as the second-minimum, third-minimum, etc. Given some selected number n, the process can find the n lowest unique humidities indicated by the dynamic collection. If n=1, the process determines the absolute minimum humidity indicated (i.e. the lowest humidity value in the dynamic collection). If n=2, the process determines the absolute minimum ($1^{st}$-minimum) as well as the next-greater ($2^{nd}$-minimum) humidity value in the dynamic collection. When n>1, these are necessarily different humidities and are the n lowest unique humidities indicated by the dynamic collection of past humidity values, including at least the lowest, second-lowest, . . . , nth-lowest humidities indicated by the dynamic collection of past humidity values.

The baseline can be selected based on the n lowest unique humidities indicated by the dynamic collection. In FIG. 6, two options are presented. The first determines and returns (604) the baseline as the nth-minimum past humidity value of the dynamic collection of past humidity values, where the nth-minimum past humidity value is the nth-lowest unique humidity indicated by the dynamic collection of past humidity values. If n=1, the nth-minimum, i.e. the $1^{st}$-minimum, is the lowest humidity indicated by the dynamic collection of past humidity values. If n>1, are n−1 lower unique humidities indicated by the dynamic collection of past humidity values.

The second option of FIG. 6 determines and returns (606) the baseline value as a function of the n unique humidities indicated by the dynamic collection of past humidity values, where n>1. The function could be or include an average of the n humidity values, for instance.

Returning to FIG. 5, the process receives (506) a current humidity value of the environment. By current humidity value is meant the most recent humidity value sensed in the environment by the humidity sensor, and typically is provided to the processor performing the process near-instantly after being sensed. The process then determines (508), based on the current humidity value of the environment and the baseline humidity value, whether to transition a switching circuit from an OFF state, in which the switching circuit does not conduct the supply of electrical power to the load, to an ON state in which the switching circuit conducts the supply of electrical power to the load.

In examples, the determining whether to transition from the OFF state to the ON state includes comparing the current humidity value to a threshold humidity value. The threshold can be set by any desirable approach, one example such approach is described with reference to FIG. 8. For example, the threshold humidity value may be dynamically set based on a difference between the baseline humidity value and a second humidity value that is greater than the baseline humidity value. The threshold humidity value could be set equal to the baseline humidity value plus a proportion of the difference between the baseline humidity value and the second humidity value, for instance.

In any case, after determining at 508 whether to transition, the process proceeds by performing further processing based on that determination whether to transition the switching circuit from the OFF state to the ON state. For instance, if it is determined to transition (508, Y), the process transitions (510) the switching circuit to the ON state. Then, or if it was determined at 508 not to transition (508, N)—for instance because the threshold was not reached, the process proceeds by, in this example, looping back to a prior aspect of FIG. 5, for instance to continue to maintain the dynamic collection and eventually progressing through FIG. 5. In this regard, there may be a built in delay or halt while the switching circuit remains in the ON state to power the load and optionally the process might branch to or invoke another process to determine when to transition the switching circuit back to the OFF state before progressing with the process of FIG. 5 again.

Additionally or alternatively, aspects could be repeated at any point. For instance, the process may repeat the determining the baseline humidity value (504) based on a change to the dynamic collection of past humidity values, for instance the discarding from the dynamic collection of past humidity values a past humidity value equal to the baseline humidity value, or receipt for inclusion in the dynamic collection of past humidity values a next humidity value that is less than the baseline humidity value.

Figure 7:
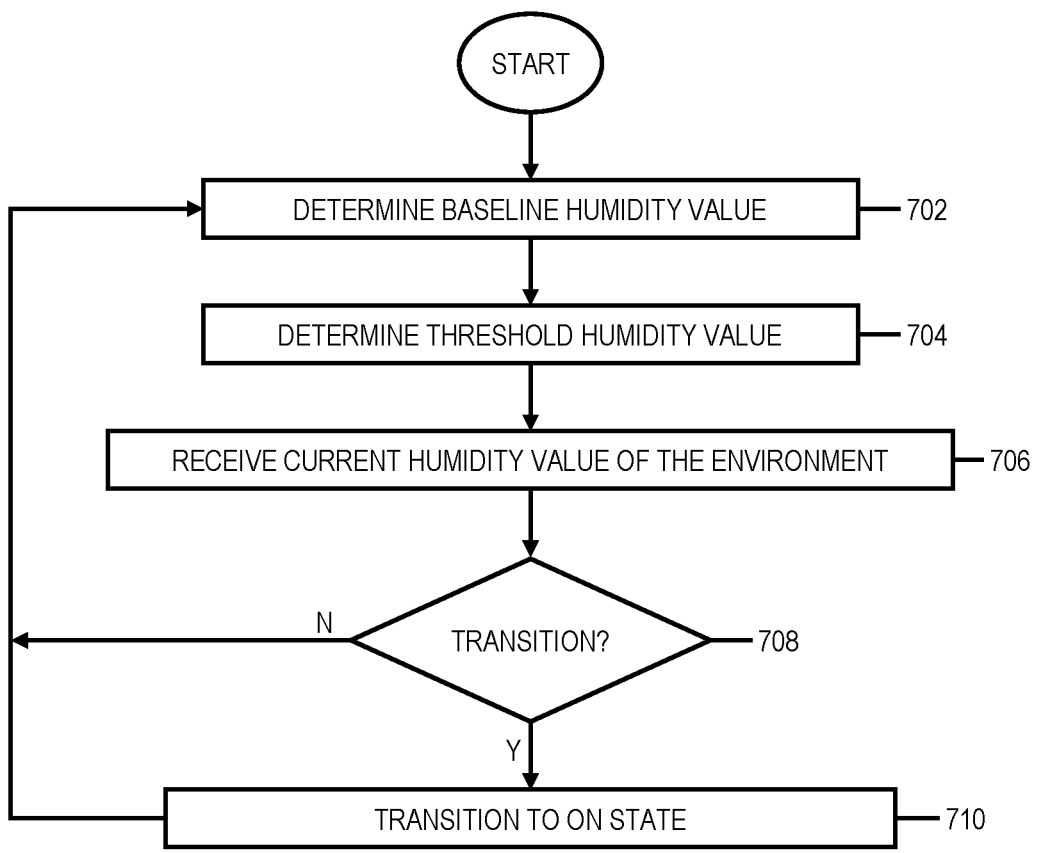

FIG. 7 depicts another example process for controlling conduction of a supply of electrical power to a load based on sensed humidity readings in an environment. The process determines (702) a baseline humidity value based on at least one past humidity value received from a humidity sensor in the environment. The baseline humidity value can be determined by any desirable approach. One example such approach is described above and with reference to FIG. 6. For example, the at least one past humidity value can include a dynamic collection of past humidity values received from the humidity sensor, where the dynamic collection of past humidity values changes based on passage of time and receipt of additional humidity values from the humidity sensor, and the baseline can be determined based on the dynamic collection. For instance, determining the baseline humidity value can determine an nth-minimum past humidity value of the dynamic collection of past humidity values, the nth-minimum past humidity value being the nth-lowest unique humidity indicated by the dynamic collection of past humidity values, where the determined baseline humidity value is taken as the determined nth-minimum. In examples, n is greater than or equal to 2, in which there are n−1 lower unique humidities indicated by the dynamic collection of past humidity values.

Continuing with FIG. 7, the process also determines (704) a threshold humidity value as a function of the baseline humidity value and a second humidity value greater than the baseline humidity value. An example process for determining a threshold humidity value in this manner is presented in FIG. 8, in which the function includes a proportion of a difference between the baseline humidity value and the second humidity value.

Figure 8:
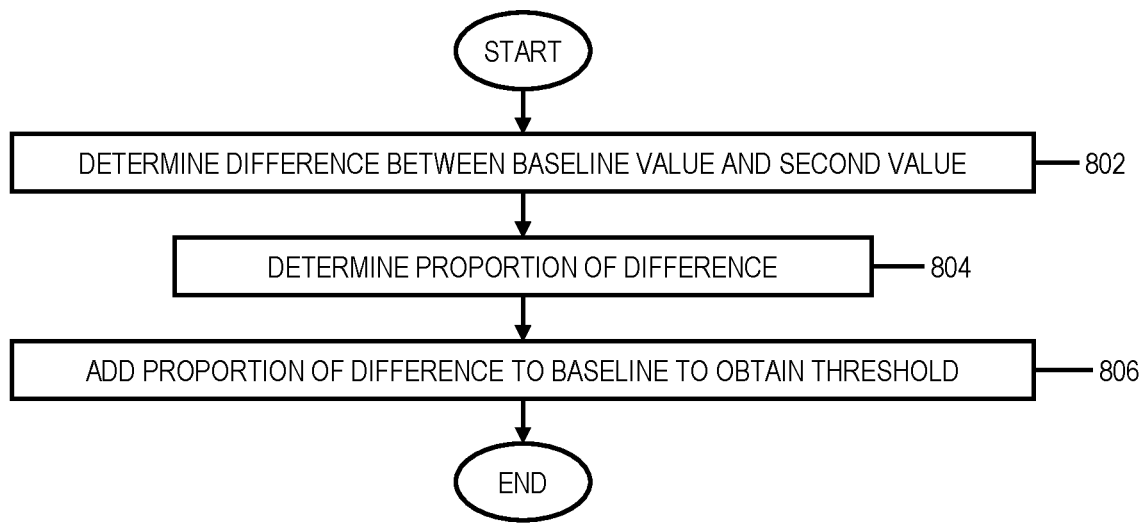

Referring to FIG. 8, the process determines (802) a difference between the baseline humidity value and the second humidity value, determines (804) a proportion (for instance 50%) of that difference, and adds (806) the proportion to the baseline to obtain the threshold. In this manner, the threshold humidity value is set equal to the baseline humidity value plus the proportion of the difference between the baseline humidity value and the second humidity value. In examples, the proportion is between 25% and 75%. In a more particular example, the proportion is 50% such that the determined threshold humidity value is the midpoint between the baseline humidity value and the second humidity value. The second humidity value can be a saturation humidity of air in the environment, for instance 100% relative humidity.

Returning to FIG. 7, the process receives (706) a current humidity value of the environment and then determines (708), based on the current humidity value and the determined threshold humidity value, whether to transition a switching circuit from an OFF state, in which the switching circuit does not conduct the supply of electrical power to the load, to an ON state in which the switching circuit conducts the supply of electrical power to the load. The process proceeds by performing further processing based on that determination whether to transition the switching circuit from the OFF state to the ON state. For instance, if it is determined to transition (708, Y), the process transitions (710) the switching circuit to the ON state. Then, or if it was determined at 708 not to transition (708, N)—for instance because the threshold was not reached, the process proceeds by, in this example, looping back to a prior aspect of FIG. 7. There may be a built in delay or halt while the switching circuit remains in the ON state to power the load and optionally the process might branch to or invoke another process to determine when to transition the switching circuit back to the OFF state before progressing again with the process of FIG. 7.

Additionally or alternatively, aspects could be repeated at any point. For instance, the process may repeat the determining the baseline humidity value (702) and the determining the threshold (704) based on a change to the baseline.

Figure 9:
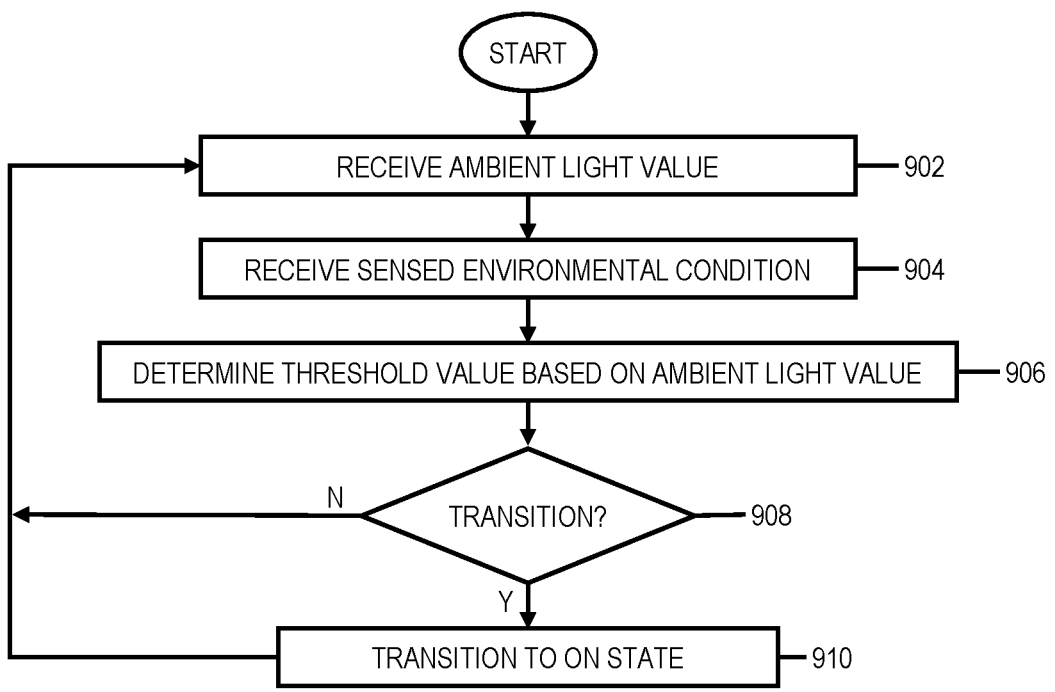

FIG. 9 depicts yet another example process for controlling conduction of a supply of electrical power to a load. The process receives (902), from an ambient light-sensing element in the environment, an ambient light value indicating a level of ambient light in the environment. The process also receives (904), from a sensor in the environment, a sensed environmental condition of the environment. As an example, the environmental condition is relative humidity and the sensed environmental condition is a current humidity value of the environment.

The process proceeds by determining (906) a threshold value based on the received ambient light value. The threshold may be a threshold for the environmental condition; in examples where the environmental condition is relative humidity the threshold value is a threshold humidity value.

The determination of the threshold value (906) can be done using any desirable approach. In one example, determining the threshold value selects a first value based on the received ambient light value indicating that ambient light in the environment is brighter than an ambient light threshold, or selects a second value, greater than the first value, based on the received ambient light value indicating that ambient light in the environment is darker than the ambient light threshold. In another example, determining the threshold value determines the threshold value as a continuous function of the received ambient light value. In some examples, for instance based on the received ambient light value exceeding an ambient light threshold, the threshold indicates that the switching circuit is not to be automatically transitioned from the OFF state to the ON state.

In yet another example, the threshold is determined using a baseline value, specifically as a function of the baseline value. The baseline value can be one that is based on at least one past value for the environmental condition, for instance at least one past humidity value received from a humidity sensor in the environment.

In a specific embodiment, the threshold is determined as presented in FIG. 8. Using the example of sensed humidity values, the threshold humidity value is determined as a function of the baseline humidity value and a second humidity value greater than the baseline humidity value, where the function includes a proportion of a difference between the baseline humidity value and the second humidity value. The threshold humidity value can be set equal to the baseline humidity value plus the proportion of the difference between the baseline humidity value and the second humidity value, as in FIG. 8.

The baseline value could be taken as the absolute minimum of a collection of sensed values. In a specific example of the latter, the baseline is determined as presented in FIG. 6. For instance, the at least one past humidity value on which the baseline is based can include a dynamic collection of past humidity values received from a humidity sensor, where the dynamic collection of past humidity values changes based on passage of time and receipt of additional humidity values from the humidity sensor. Determining the baseline humidity value could determine an nth-minimum past humidity value of the dynamic collection of past humidity values, the nth-minimum past humidity value being the nth-lowest unique humidity indicated by the dynamic collection of past humidity values, where the determined baseline humidity value is taken as the determined nth-minimum. In specific examples, n is greater than or equal to 2, in which there are n−1 lower unique humidities indicated by the dynamic collection of past humidity values.

Returning to FIG. 9, the process then determines (908), based on the sensed environmental condition and the determined threshold value, whether to transition a switching circuit from an OFF state, in which the switching circuit does not conduct the supply of electrical power to the load, to an ON state in which the switching circuit conducts the supply of electrical power to the load. The process proceeds by performing further processing based on that determination whether to transition the switching circuit from the OFF state to the ON state. For instance, if it is determined to transition (908, Y), the process transitions (910) the switching circuit to the ON state. Then, or if it was determined at 908 not to transition (908, N)—for instance because the threshold was not reached, the process proceeds by, in this example, looping back to a prior aspect of FIG. 9. There may be a built in delay or halt while the switching circuit remains in the ON state to power the load and optionally the process might branch to or invoke another process to determine when to transition the switching circuit back to the OFF state before progressing again with the process of FIG. 9.

Additionally or alternatively, aspects could be repeated at any point. For instance, the process may repeat the determining the threshold (906) based on a change to the ambient light value and/or baseline, as examples.

In accordance with some aspects, combinations of windowing, proportional switching threshold, and/or ambient light sensing methods may be provided.

For instance, a method for controlling conduction of a supply of electrical power to a load includes (i) maintaining a dynamic collection of past humidity values received from a humidity sensor in the environment, where the dynamic collection of past humidity values changes based on passage of time and receipt of additional humidity values from the humidity sensor, (ii) determining a baseline humidity value based on identification of a lowest humidity value of the dynamic collection of past humidity values, receiving a current humidity value of the environment, (iii) determining, based on the current humidity value of the environment and the baseline humidity value, whether to transition a switching circuit from an OFF state, in which the switching circuit does not conduct the supply of electrical power to the load, to an ON state in which the switching circuit conducts the supply of electrical power to the load, and (iv) performing processing based on the determining whether to transition the switching circuit from the OFF state to the ON state, and further includes (v) determining a threshold humidity value as a function of the baseline humidity value and a second humidity value greater than the baseline humidity value, where the determining whether to transition the switching circuit is further based on the determined threshold humidity value.

In another embodiment a method for controlling conduction of a supply of electrical power to a load includes (i) maintaining a dynamic collection of past humidity values received from a humidity sensor in the environment, where the dynamic collection of past humidity values changes based on passage of time and receipt of additional humidity values from the humidity sensor, (ii) determining a baseline humidity value based on identification of a lowest humidity value of the dynamic collection of past humidity values, receiving a current humidity value of the environment, (iii) determining, based on the current humidity value of the environment and the baseline humidity value, whether to transition a switching circuit from an OFF state, in which the switching circuit does not conduct the supply of electrical power to the load, to an ON state in which the switching circuit conducts the supply of electrical power to the load, and (iv) performing processing based on the determining whether to transition the switching circuit from the OFF state to the ON state, and further includes (v) receiving, from an ambient light-sensing element in the environment, an ambient light value indicating a level of ambient light in the environment, and (vi) determining a threshold humidity value based on the received ambient light value, where the determining whether to transition the switching circuit is further based on the determined threshold humidity value.

In another embodiment, a method for controlling conduction of a supply of electrical power to a load includes (i) maintaining a dynamic collection of past humidity values received from a humidity sensor in the environment, where the dynamic collection of past humidity values changes based on passage of time and receipt of additional humidity values from the humidity sensor, (ii) determining a baseline humidity value based on identification of a lowest humidity value of the dynamic collection of past humidity values, receiving a current humidity value of the environment, (iii) determining, based on the current humidity value of the environment and the baseline humidity value, whether to transition a switching circuit from an OFF state, in which the switching circuit does not conduct the supply of electrical power to the load, to an ON state in which the switching circuit conducts the supply of electrical power to the load, and (iv) performing processing based on the determining whether to transition the switching circuit from the OFF state to the ON state, and further includes (v) receiving, from an ambient light-sensing element in the environment, an ambient light value indicating a level of ambient light in the environment, and (vi) determining a threshold humidity value based on the received ambient light value, the baseline humidity value, and a second humidity value greater than the baseline humidity value, wherein the determining whether to transition the switching circuit is further based on the determined threshold humidity value.

In another embodiment, a method for controlling conduction of a supply of electrical power to a load includes (i) determining a baseline humidity value based on at least one past humidity value received from a humidity sensor in the environment, (ii) determining a threshold humidity value as a function of the baseline humidity value and a second humidity value greater than the baseline humidity value, (iii) receiving a current humidity value of the environment, (iv) determining, based on the current humidity value and the determined threshold humidity value, whether to transition a switching circuit from an OFF state, in which the switching circuit does not conduct the supply of electrical power to the load, to an ON state in which the switching circuit conducts the supply of electrical power to the load, and (v) performing processing based on the determining whether to transition the switching circuit from the OFF state to the ON state, and further includes (vi) maintaining a dynamic collection of past humidity values received from the humidity sensor, where the dynamic collection of past humidity values changes based on passage of time and receipt of additional humidity values from the humidity sensor, where the determining the baseline humidity value is based on identification of a lowest humidity value of the dynamic collection of past humidity values.

In another embodiment, a method for controlling conduction of a supply of electrical power to a load includes (i) determining a baseline humidity value based on at least one past humidity value received from a humidity sensor in the environment, (ii) determining a threshold humidity value as a function of the baseline humidity value and a second humidity value greater than the baseline humidity value, (iii) receiving a current humidity value of the environment, (iv) determining, based on the current humidity value and the determined threshold humidity value, whether to transition a switching circuit from an OFF state, in which the switching circuit does not conduct the supply of electrical power to the load, to an ON state in which the switching circuit conducts the supply of electrical power to the load, and (v) performing processing based on the determining whether to transition the switching circuit from the OFF state to the ON state, and further includes (vi) receiving, from an ambient light-sensing element in the environment, an ambient light value indicating a level of ambient light in the environment, where the determined threshold humidity value is further based on the received ambient light value.

In another embodiment, a method for controlling conduction of a supply of electrical power to a load includes (i) determining a baseline humidity value based on at least one past humidity value received from a humidity sensor in the environment, (ii) determining a threshold humidity value as a function of the baseline humidity value and a second humidity value greater than the baseline humidity value, (iii) receiving a current humidity value of the environment, (iv) determining, based on the current humidity value and the determined threshold humidity value, whether to transition a switching circuit from an OFF state, in which the switching circuit does not conduct the supply of electrical power to the load, to an ON state in which the switching circuit conducts the supply of electrical power to the load, and (v) performing processing based on the determining whether to transition the switching circuit from the OFF state to the ON state, and further includes (vi) maintaining a dynamic collection of past humidity values received from the humidity sensor, where the dynamic collection of past humidity values changes based on passage of time and receipt of additional humidity values from the humidity sensor, where the determining the baseline humidity value is based on identification of a lowest humidity value of the dynamic collection of past humidity values, and (vii) receiving, from an ambient light-sensing element in the environment, an ambient light value indicating a level of ambient light in the environment, wherein the determined threshold humidity value is further based on the received ambient light value.

In another embodiment, a method for controlling conduction of a supply of electrical power to a load includes (i) receiving, from an ambient light-sensing element in the environment, an ambient light value indicating a level of ambient light in the environment, (ii) receiving, from a sensor in the environment, a sensed environmental condition of the environment, where the environmental condition is relative humidity and the sensed environmental condition is a current humidity value of the environment, (iii) determining a threshold value based on the received ambient light value, where the threshold value is a threshold humidity value, (iv) determining, based on the sensed environmental condition and the determined threshold value, whether to transition a switching circuit from an OFF state, in which the switching circuit does not conduct the supply of electrical power to the load, to an ON state in which the switching circuit conducts the supply of electrical power to the load, and (v) performing processing based on the determining whether to transition the switching circuit from the OFF state to the ON state, and further includes, (vi) maintaining a dynamic collection of past humidity values received from a humidity sensor in the environment, where the dynamic collection of past humidity values changes based on passage of time and receipt of additional humidity values from the humidity sensor, and (vii) determining a baseline humidity value based on identification of a lowest humidity value of the dynamic collection of past humidity values, where the determining whether to transition is further based on the determined baseline humidity value.

In another embodiment, a method for controlling conduction of a supply of electrical power to a load includes (i) receiving, from an ambient light-sensing element in the environment, an ambient light value indicating a level of ambient light in the environment, (ii) receiving, from a sensor in the environment, a sensed environmental condition of the environment, where the environmental condition is relative humidity and the sensed environmental condition is a current humidity value of the environment, (iii) determining a threshold value based on the received ambient light value, where the threshold value is a threshold humidity value, (iv) determining, based on the sensed environmental condition and the determined threshold value, whether to transition a switching circuit from an OFF state, in which the switching circuit does not conduct the supply of electrical power to the load, to an ON state in which the switching circuit conducts the supply of electrical power to the load, and (v) performing processing based on the determining whether to transition the switching circuit from the OFF state to the ON state, and further includes, (vi) determining a baseline humidity value based on at least one past humidity value received from a humidity sensor in the environment, where the determined threshold humidity value is further based on the baseline humidity value and a second humidity value greater than the baseline humidity value.

In another embodiment, a method for controlling conduction of a supply of electrical power to a load includes (i) receiving, from an ambient light-sensing element in the environment, an ambient light value indicating a level of ambient light in the environment, (ii) receiving, from a sensor in the environment, a sensed environmental condition of the environment, where the environmental condition is relative humidity and the sensed environmental condition is a current humidity value of the environment, (iii) determining a threshold value based on the received ambient light value, where the threshold value is a threshold humidity value, (iv) determining, based on the sensed environmental condition and the determined threshold value, whether to transition a switching circuit from an OFF state, in which the switching circuit does not conduct the supply of electrical power to the load, to an ON state in which the switching circuit conducts the supply of electrical power to the load, and (v) performing processing based on the determining whether to transition the switching circuit from the OFF state to the ON state, and further includes (vi) maintaining a dynamic collection of past humidity values received from a humidity sensor in the environment, where the dynamic collection of past humidity values changes based on passage of time and receipt of additional humidity values from the humidity sensor, and (vii) determining a baseline humidity value based on identification of a lowest humidity value of the dynamic collection of past humidity values, where the determined threshold humidity value is further based on the baseline humidity value and a second humidity value greater than the baseline humidity value.

Although various examples are provided, variations are possible without departing from a spirit of the claimed aspects.

Figure 10:
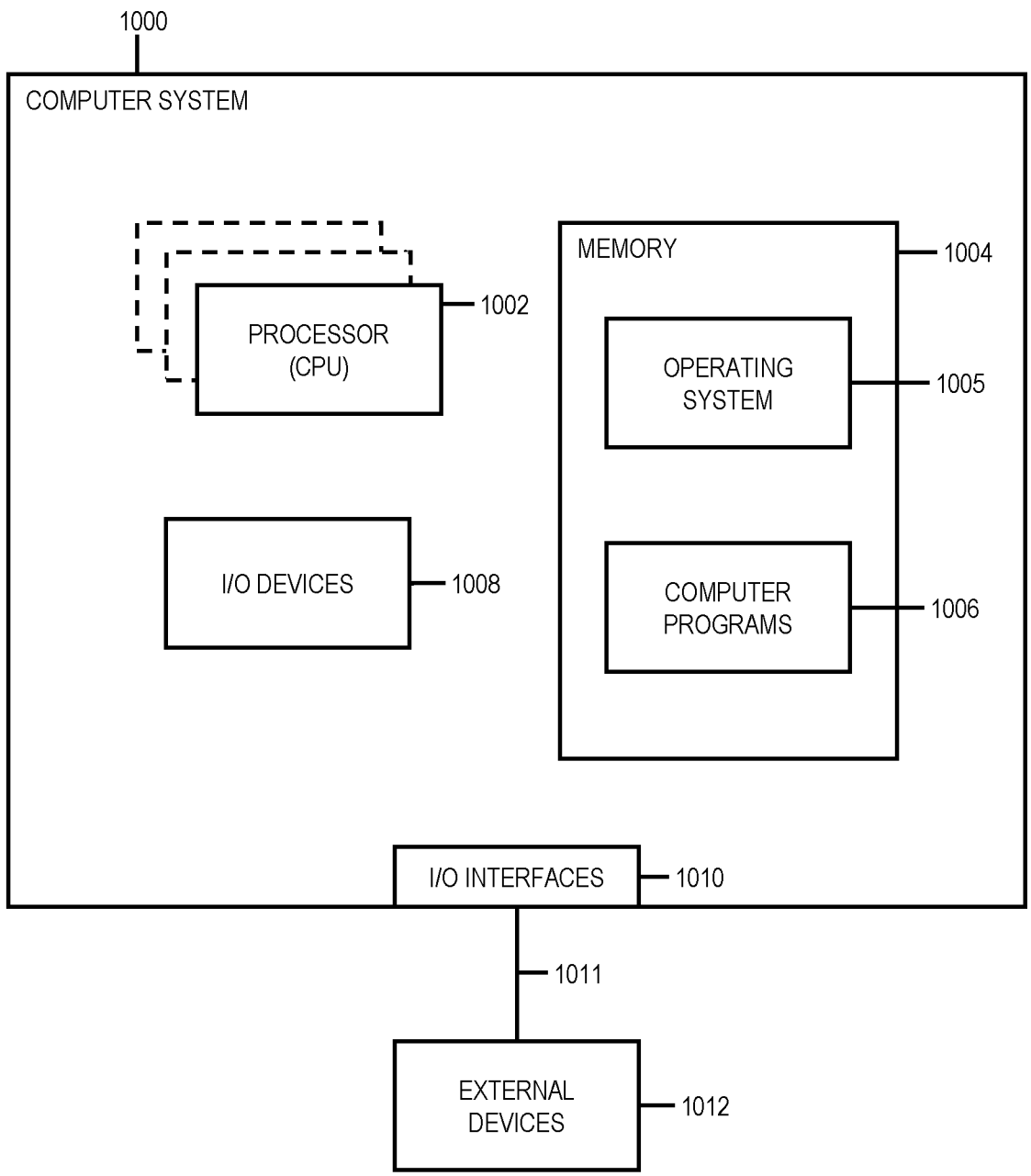
FIG. 10 depicts one example of a computer system and associated devices to incorporate and/or use aspects described herein.

Systems described herein, including those referred to herein as electrical load controllers, may be regarded in some respects as a computer system capable of executing program instructions to perform processes/methods. Thus, processes as described herein may be performed by one or more computer systems, such as those described herein, which may include one or more wall-box-installed switches and/or one or more computer systems of or connected thereto, such as one or more cloud servers, one or more embedded computers, and/or one or more other computer systems. FIG. 10 depicts one example of a computer system and associated devices to incorporate and/or use aspects described herein. A computer system may also be referred to herein as a data processing device/system, computing device/system/node, or simply a computer. The computer system may be based on one or more of various system architectures and/or instruction set architectures.

FIG. 10 shows a computer system 1000 in communication with external device(s) 1012. Computer system 1000 includes one or more processor(s) 1002, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 1002 can also include register(s) to be used by one or more of the functional components. Computer system 1000 also includes memory 1004, input/output (I/O) devices 1008, and I/O interfaces 1010, which may be coupled to processor(s) 1002 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 1004 can be or include main or system memory (e.g. Random Access Memory) used in the execution of program instructions, storage device(s) such as hard drive(s), flash media, or optical media as examples, and/or cache memory, as examples. Memory 1004 can include, for instance, a cache, such as a shared cache, which may be coupled to local caches (examples include L1 cache, L2 cache, etc.) of processor(s) 1002. Additionally, memory 1004 may be or include at least one computer program product having a set (e.g., at least one) of program modules, instructions, code or the like that is/are configured to carry out functions of embodiments described herein when executed by one or more processors.

Memory 1004 can store an operating system 1005 and other computer programs 1006, such as one or more computer programs/applications that execute to perform aspects described herein. Specifically, programs/applications can include computer readable program instructions that may be configured to carry out functions of embodiments of aspects described herein.

Examples of I/O devices 1008 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (1012) coupled to the computer system through one or more I/O interfaces 1010.

Computer system 1000 may communicate with one or more external devices 1012 via one or more I/O interfaces 1010. Example external devices include a keyboard, a pointing device, a display, and/or any other devices that enable a user to interact with computer system 1000. Other example external devices include any device that enables computer system 1000 to communicate with one or more other computing systems or peripheral devices such as a printer. A network interface/adapter is an example I/O interface that enables computer system 1000 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 1010 and external devices 1012 can occur across wired and/or wireless communications link(s) 1011, such as Ethernet-based wired or wireless connections. Example wireless connections include cellular, Wi-Fi, Bluetooth®, proximity-based, near-field, or other types of wireless connections. More generally, communications link(s) 1011 may be any appropriate wireless and/or wired communication link(s) for communicating data.

Particular external device(s) 1012 may include one or more data storage devices, which may store one or more programs, one or more computer readable program instructions, and/or data, etc. Computer system 1000 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 1000 may be operational with numerous other general purpose or special purpose computing system environments or configurations. Computer system 1000 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects described herein may be a system, a method, and/or a computer program product, any of which may be configured to perform or facilitate aspects described herein.

In some embodiments, aspects may take the form of a computer program product, which may be embodied as computer readable medium(s). A computer readable medium may be a tangible storage device/medium having computer readable program code/instructions stored thereon. Example computer readable medium(s) include, but are not limited to, electronic, magnetic, optical, or semiconductor storage devices or systems, or any combination of the foregoing. Example embodiments of a computer readable medium include a hard drive or other mass-storage device, an electrical connection having wires, random access memory (RAM), read-only memory (ROM), erasable-programmable read-only memory such as EPROM or flash memory, an optical fiber, a portable computer disk/diskette, such as a compact disc read-only memory (CD-ROM) or Digital Versatile Disc (DVD), an optical storage device, a magnetic storage device, or any combination of the foregoing. The computer readable medium may be readable by a processor, processing unit, or the like, to obtain data (e.g. instructions) from the medium for execution. In a particular example, a computer program product is or includes one or more computer readable media that includes/stores computer readable program code to provide and facilitate one or more aspects described herein.

As noted, program instruction contained or stored in/on a computer readable medium can be obtained and executed by any of various suitable components such as a processor of a computer system to cause the computer system to behave and function in a particular manner. Such program instructions for carrying out operations to perform, achieve, or facilitate aspects described herein may be written in, or compiled from code written in, any desired programming language. In some embodiments, such programming language includes object-oriented and/or procedural programming languages such as C, C++, C #, Java, etc.

Program code can include one or more program instructions obtained for execution by one or more processors. Computer program instructions may be provided to one or more processors of, e.g., one or more computer systems, to produce a machine, such that the program instructions, when executed by the one or more processors, perform, achieve, or facilitate aspects described herein, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

Although various embodiments are described above, these are only examples.

Provided is a small sampling of embodiments of the present disclosure, as described herein:

1. A method for controlling conduction of a supply of electrical power to a load, the method comprising: maintaining a dynamic collection of past humidity values received from a humidity sensor in the environment, wherein the dynamic collection of past humidity values changes based on passage of time and receipt of additional humidity values from the humidity sensor; determining a baseline humidity value based on identification of a lowest humidity value of the dynamic collection of past humidity values; receiving a current humidity value of the environment; determining, based on the current humidity value of the environment and the baseline humidity value, whether to transition a switching circuit from an OFF state, in which the switching circuit does not conduct the supply of electrical power to the load, to an ON state in which the switching circuit conducts the supply of electrical power to the load; and performing processing based on the determining whether to transition the switching circuit from the OFF state to the ON state.

2. The method of 1, wherein the determining the baseline humidity value determines an nth-minimum past humidity value of the dynamic collection of past humidity values, the nth-minimum past humidity value being the nth-lowest unique humidity indicated by the dynamic collection of past humidity values, wherein the determined baseline humidity value is taken as the determined nth-minimum.

3. The method of 2, wherein n=1, in which the nth-minimum is the lowest humidity indicated by the dynamic collection of past humidity values.

4. The method of 2, wherein n is greater than or equal to 2, in which there are n−1 lower unique humidities indicated by the dynamic collection of past humidity values.

5. The method of 1, wherein the determining the baseline value determines the baseline value as a function of n unique humidities indicated by the dynamic collection of past humidity values, wherein n>1.

6. The method of 5, wherein the function comprises an average of the n humidity values.

7. The method of 5, wherein the n unique humidities are the n lowest unique humidities indicated by the dynamic collection of past humidity values, the n lowest comprising at least the lowest and second-lowest humidities indicated by the dynamic collection of past humidity values.

8. The method of 1, wherein the determining whether to transition from the OFF state to the ON state comprises comparing the current humidity value to a threshold humidity value.

9. The method of 8, wherein the threshold humidity value is dynamically set based on a difference between the baseline humidity value and a second humidity value greater than the baseline humidity value.

10. The method of 9, wherein the threshold humidity value is equal to the baseline humidity value plus a proportion of the difference between the baseline humidity value and the second humidity value.

11. The method of 1, wherein the dynamic collection of past humidity values comprises a set of most recently received past humidity values sensed by the humidity sensor in the environment.

12. The method of 11, wherein the set of most recently received past humidity values sensed by the humidity sensor includes one selected from the group consisting of: (i) at most a predefined number of most recently received past humidity values to maintain in the dynamic collection; and (ii) only past humidity values received within a defined window of time ending at a current time.

13. The method of 1, further comprising repeating the determining the baseline humidity value based on a change to the dynamic collection of past humidity values.

14. The method of 13, wherein the change comprises discarding from the dynamic collection of past humidity values a past humidity value equal to the baseline humidity value.

15. The method of 13, wherein the change comprises receiving for inclusion in the dynamic collection of past humidity values a next humidity value less than the baseline humidity value.

16. The method of 1, wherein the load comprises a ventilation fan to dehumidify the environment.

17. The method of 1, further comprising determining a threshold humidity value as a function of the baseline humidity value and a second humidity value greater than the baseline humidity value, wherein the determining whether to transition the switching circuit is further based on the determined threshold humidity value.

18. The method of 1, further comprising: receiving, from an ambient light-sensing element in the environment, an ambient light value indicating a level of ambient light in the environment; and determining a threshold humidity value based on the received ambient light value; wherein the determining whether to transition the switching circuit is further based on the determined threshold humidity value.

19. The method of 1, further comprising: receiving, from an ambient light-sensing element in the environment, an ambient light value indicating a level of ambient light in the environment; and determining a threshold humidity value based on the received ambient light value, the baseline humidity value, and a second humidity value greater than the baseline humidity value; wherein the determining whether to transition the switching circuit is further based on the determined threshold humidity value.

20. An electrical load controller for controlling conduction of a supply of electrical power to a load, the electrical load controller comprising: a line input terminal and a load output terminal, the line input terminal configured to be electrically coupled to the supply of electrical power, and the load output terminal configured to be electrically coupled to the load; a switching circuit electrically coupled in series between the line input terminal and the load output terminal, the switching circuit having an ON state in which the switching circuit conducts the supply of electrical power to the load, and an OFF state in which the switching circuit does not conduct the supply of electrical power to the load; and a microcontroller configured to perform a method comprising: maintaining a dynamic collection of past humidity values received from a humidity sensor in the environment, wherein the dynamic collection of past humidity values changes based on passage of time and receipt of additional humidity values from the humidity sensor; determining a baseline humidity value based on identification of a lowest humidity value of the dynamic collection of past humidity values; receiving a current humidity value of the environment; determining, based on the current humidity value of the environment and the baseline humidity value, whether to transition the switching circuit from the OFF state to the ON state; and performing processing based on the determining whether to transition the switching circuit from the OFF state to the ON state.

21. The electrical load controller of 20, wherein the electrical load controller further comprises the humidity sensor.

22. The electrical load controller of 20, wherein the determining the baseline humidity value determines an nth-minimum past humidity value of the dynamic collection of past humidity values, the nth-minimum past humidity value being the nth-lowest unique humidity indicated by the dynamic collection of past humidity values, wherein the determined baseline humidity value is taken as the determined nth-minimum.

23. The electrical load controller of 22, wherein n=1, in which the nth-minimum is the lowest humidity indicated by the dynamic collection of past humidity values.

24. The electrical load controller of 22, wherein n is greater than or equal to 2, in which there are n−1 lower unique humidities indicated by the dynamic collection of past humidity values.

25. The electrical load controller of 20, wherein the determining the baseline value determines the baseline value as a function of n unique humidities indicated by the dynamic collection of past humidity values, wherein n>1.

26. The electrical load controller of 25, wherein the function comprises an average of the n humidity values.

27. The electrical load controller of 25, wherein the n unique humidities are the n lowest unique humidities indicated by the dynamic collection of past humidity values, the n lowest comprising at least the lowest and second-lowest humidities indicated by the dynamic collection of past humidity values.

28. The electrical load controller of 20, wherein the determining whether to transition from the OFF state to the ON state comprises comparing the current humidity value to a threshold humidity value.

29. The electrical load controller of 28, wherein the threshold humidity value is dynamically set based on a difference between the baseline humidity value and a second humidity value greater than the baseline humidity value.

30. The electrical load controller of 29, wherein the threshold humidity value is equal to the baseline humidity value plus a proportion of the difference between the baseline humidity value and the second humidity value.

31. The electrical load controller of 20, wherein the dynamic collection of past humidity values comprises a set of most recently received past humidity values sensed by the humidity sensor in the environment.

32. The electrical load controller of 31, wherein the set of most recently received past humidity values sensed by the humidity sensor includes one selected from the group consisting of: (i) at most a predefined number of most recently received past humidity values to maintain in the dynamic collection; and (ii) only past humidity values received within a defined window of time ending at a current time.

33. The electrical load controller of 20, wherein the method further comprises repeating the determining the baseline humidity value based on a change to the dynamic collection of past humidity values.

34. The electrical load controller of 33, wherein the change comprises discarding from the dynamic collection of past humidity values a past humidity value equal to the baseline humidity value.

35. The electrical load controller of 33, wherein the change comprises receiving for inclusion in the dynamic collection of past humidity values a next humidity value less than the baseline humidity value.

36. The electrical load controller of 20, wherein the load comprises a ventilation fan to dehumidify the environment.

37. The electrical load controller of 20, wherein the method further comprises determining a threshold humidity value as a function of the baseline humidity value and a second humidity value greater than the baseline humidity value, wherein the determining whether to transition the switching circuit is further based on the determined threshold humidity value.

38. The electrical load controller of 20, wherein the method further comprises: receiving, from an ambient light-sensing element in the environment, an ambient light value indicating a level of ambient light in the environment; and determining a threshold humidity value based on the received ambient light value; wherein the determining whether to transition the switching circuit is further based on the determined threshold humidity value.

39. The electrical load controller of 20, wherein the method further comprises: receiving, from an ambient light-sensing element in the environment, an ambient light value indicating a level of ambient light in the environment; and determining a threshold humidity value based on the received ambient light value, the baseline humidity value, and a second humidity value greater than the baseline humidity value; wherein the determining whether to transition the switching circuit is further based on the determined threshold humidity value.

40. A method for controlling conduction of a supply of electrical power to a load, the method comprising: determining a baseline humidity value based on at least one past humidity value received from a humidity sensor in the environment; determining a threshold humidity value as a function of the baseline humidity value and a second humidity value greater than the baseline humidity value; receiving a current humidity value of the environment; determining, based on the current humidity value and the determined threshold humidity value, whether to transition a switching circuit from an OFF state, in which the switching circuit does not conduct the supply of electrical power to the load, to an ON state in which the switching circuit conducts the supply of electrical power to the load; and performing processing based on the determining whether to transition the switching circuit from the OFF state to the ON state.

41. The method of 40, wherein the function comprises a proportion of a difference between the baseline humidity value and the second humidity value.

42. The method of 41, wherein the threshold humidity value is set equal to the baseline humidity value plus the proportion of the difference between the baseline humidity value and the second humidity value.

43. The method of 42, wherein the proportion is between 25% and 75%.

44. The method of 43, wherein the proportion is 50% such that the determined threshold humidity value is the midpoint between the baseline humidity value and the second humidity value.

45. The method of 41, wherein the at least one past humidity value comprises a dynamic collection of past humidity values received from the humidity sensor, wherein the dynamic collection of past humidity values changes based on passage of time and receipt of additional humidity values from the humidity sensor.

46. The method of 45, wherein the determining the baseline humidity value determines an nth-minimum past humidity value of the dynamic collection of past humidity values, the nth-minimum past humidity value being the nth-lowest unique humidity indicated by the dynamic collection of past humidity values, wherein the determined baseline humidity value is taken as the determined nth-minimum.

47. The method of 46, wherein n is greater than or equal to 2, in which there are n−1 lower unique humidities indicated by the dynamic collection of past humidity values.

48. The method of 40, wherein the second humidity value is a saturation humidity of air in the environment.

49. The method of 48, wherein the saturation humidity is 100% relative humidity.

50. The method of 40, further comprising repeating the determining the threshold humidity value based on a change to the baseline humidity value.

51. The method of 40, wherein the load comprises a ventilation fan to dehumidify the environment.

52. The method of 40, further comprising maintaining a dynamic collection of past humidity values received from the humidity sensor, wherein the dynamic collection of past humidity values changes based on passage of time and receipt of additional humidity values from the humidity sensor, wherein the determining the baseline humidity value is based on identification of a lowest humidity value of the dynamic collection of past humidity values.

53. The method of 40, further comprising receiving, from an ambient light-sensing element in the environment, an ambient light value indicating a level of ambient light in the environment, wherein the determined threshold humidity value is further based on the received ambient light value.

54. The method of 40, further comprising: maintaining a dynamic collection of past humidity values received from the humidity sensor, wherein the dynamic collection of past humidity values changes based on passage of time and receipt of additional humidity values from the humidity sensor, wherein the determining the baseline humidity value is based on identification of a lowest humidity value of the dynamic collection of past humidity values; and receiving, from an ambient light-sensing element in the environment, an ambient light value indicating a level of ambient light in the environment, wherein the determined threshold humidity value is further based on the received ambient light value.

55. An electrical load controller for controlling conduction of a supply of electrical power to a load, the electrical load controller comprising: a line input terminal and a load output terminal, the line input terminal configured to be electrically coupled to the supply of electrical power, and the load output terminal configured to be electrically coupled to the load; a switching circuit electrically coupled in series between the line input terminal and the load output terminal, the switching circuit having an ON state in which the switching circuit conducts the supply of electrical power to the load, and an OFF state in which the switching circuit does not conduct the supply of electrical power to the load; and a microcontroller configured to perform: determining a baseline humidity value based on at least one past humidity value received from a humidity sensor in the environment; determining a threshold humidity value as a function of the baseline humidity value and a second humidity value greater than the baseline humidity value; receiving a current humidity value of the environment; determining, based on the current humidity value and the determined threshold humidity value, whether to transition the switching circuit from the OFF state to the ON state; and performing processing based on the determining whether to transition the switching circuit from the OFF state to the ON state.

56. The electrical load controller of 55, wherein the function comprises a proportion of a difference between the baseline humidity value and the second humidity value.

57. The electrical load controller of 56, wherein the threshold humidity value is set equal to the baseline humidity value plus the proportion of the difference between the baseline humidity value and the second humidity value.

58. The electrical load controller of 57, wherein the proportion is between 25% and 75%.

59. The electrical load controller of 58, wherein the proportion is 50% such that the determined threshold humidity value is the midpoint between the baseline humidity value and the second humidity value.

60. The electrical load controller of 56, wherein the at least one past humidity value comprises a dynamic collection of past humidity values received from the humidity sensor, wherein the dynamic collection of past humidity values changes based on passage of time and receipt of additional humidity values from the humidity sensor.

61. The electrical load controller of 60, wherein the determining the baseline humidity value determines an nth-minimum past humidity value of the dynamic collection of past humidity values, the nth-minimum past humidity value being the nth-lowest unique humidity indicated by the dynamic collection of past humidity values, wherein the determined baseline humidity value is taken as the determined nth-minimum.

62. The electrical load controller of 61, wherein n is greater than or equal to 2, in which there are n−1 lower unique humidities indicated by the dynamic collection of past humidity values.

63. The electrical load controller of 55, wherein the second humidity value is a saturation humidity of air in the environment.

64. The electrical load controller of 63, wherein the saturation humidity is 100% relative humidity.

65. The electrical load controller of 55, wherein the method further comprises repeating the determining the threshold humidity value based on a change to the baseline humidity value.

66. The electrical load controller of 55, wherein the load comprises a ventilation fan to dehumidify the environment.

67. The electrical load controller of 55, wherein the electrical load controller further comprises the humidity sensor.

68. The electrical load controller of 55, wherein the method further comprises maintaining a dynamic collection of past humidity values received from the humidity sensor, wherein the dynamic collection of past humidity values changes based on passage of time and receipt of additional humidity values from the humidity sensor, wherein the determining the baseline humidity value is based on identification of a lowest humidity value of the dynamic collection of past humidity values.

69. The electrical load controller of 55, wherein the method further comprises receiving, from an ambient light-sensing element in the environment, an ambient light value indicating a level of ambient light in the environment, wherein the determined threshold humidity value is further based on the received ambient light value.

70. The electrical load controller of 55, wherein the method further comprises: maintaining a dynamic collection of past humidity values received from the humidity sensor, wherein the dynamic collection of past humidity values changes based on passage of time and receipt of additional humidity values from the humidity sensor, wherein the determining the baseline humidity value is based on identification of a lowest humidity value of the dynamic collection of past humidity values; and receiving, from an ambient light-sensing element in the environment, an ambient light value indicating a level of ambient light in the environment, wherein the determined threshold humidity value is further based on the received ambient light value.

71. A method for controlling conduction of a supply of electrical power to a load, the method comprising: receiving, from an ambient light-sensing element in the environment, an ambient light value indicating a level of ambient light in the environment; receiving, from a sensor in the environment, a sensed environmental condition of the environment; determining a threshold value based on the received ambient light value; determining, based on the sensed environmental condition and the determined threshold value, whether to transition a switching circuit from an OFF state, in which the switching circuit does not conduct the supply of electrical power to the load, to an ON state in which the switching circuit conducts the supply of electrical power to the load; and performing processing based on the determining whether to transition the switching circuit from the OFF state to the ON state.

72. The method of 71, wherein the determining the threshold value determines the threshold value as one selected from the group consisting of: a first value based on the received ambient light value indicating that ambient light in the environment is brighter than an ambient light threshold; and a second value, greater than the first value, based on the received ambient light value indicating that ambient light in the environment is darker than the ambient light threshold.

73. The method of 71, wherein the determining the threshold value determines the threshold value as a continuous function of the received ambient light value.

74. The method of 71, wherein based on the received ambient light value exceeding an ambient light threshold, the threshold indicates that the switching circuit is not to be automatically transitioned from the OFF state to the ON state.

75. The method of 71, wherein the environmental condition is relative humidity and the sensed environmental condition is a current humidity value of the environment, wherein the threshold value is a threshold humidity value.

76. The method of 75, wherein the determining the threshold humidity value comprises: determining a baseline humidity value based on at least one past humidity value received from a humidity sensor in the environment; and determining the threshold humidity value as a function of the baseline humidity value.

77. The method of 76, further comprising determining the threshold humidity value as a function of the baseline humidity value and a second humidity value greater than the baseline humidity value, wherein the function comprises a proportion of a difference between the baseline humidity value and the second humidity value.

78. The method of 77, wherein the threshold humidity value is set equal to the baseline humidity value plus the proportion of the difference between the baseline humidity value and the second humidity value.

79. The method of 76, wherein the at least one past humidity value comprises a dynamic collection of past humidity values received from the humidity sensor, wherein the dynamic collection of past humidity values changes based on passage of time and receipt of additional humidity values from the humidity sensor.

80. The method of 79, wherein the determining the baseline humidity value determines an nth-minimum past humidity value of the dynamic collection of past humidity values, the nth-minimum past humidity value being the nth-lowest unique humidity indicated by the dynamic collection of past humidity values, wherein the determined baseline humidity value is taken as the determined nth-minimum.

81. The method of 80, wherein n is greater than or equal to 2, in which there are n−1 lower unique humidities indicated by the dynamic collection of past humidity values.

82. The method of 71, wherein the environmental condition is relative humidity and the sensed environmental condition is a current humidity value of the environment, and the threshold value is a threshold humidity value, and wherein the method further comprises: maintaining a dynamic collection of past humidity values received from a humidity sensor in the environment, wherein the dynamic collection of past humidity values changes based on passage of time and receipt of additional humidity values from the humidity sensor; determining a baseline humidity value based on identification of a lowest humidity value of the dynamic collection of past humidity values; wherein the determining whether to transition is further based on the determined baseline humidity value.

83. The method of 71, wherein the environmental condition is relative humidity, the sensed environmental condition is a current humidity value of the environment, and the threshold value is a threshold humidity value, wherein the method further comprises determining a baseline humidity value based on at least one past humidity value received from a humidity sensor in the environment, and wherein the determined threshold humidity value is further based on the baseline humidity value and a second humidity value greater than the baseline humidity value.

84. The method of 71, wherein the environmental condition is relative humidity, the sensed environmental condition is a current humidity value of the environment, and the threshold value is a threshold humidity value, wherein the method further comprises: maintaining a dynamic collection of past humidity values received from a humidity sensor in the environment, wherein the dynamic collection of past humidity values changes based on passage of time and receipt of additional humidity values from the humidity sensor; determining a baseline humidity value based on identification of a lowest humidity value of the dynamic collection of past humidity values; wherein the determined threshold humidity value is further based on the baseline humidity value and a second humidity value greater than the baseline humidity value.

85. An electrical load controller for controlling conduction of a supply of electrical power to a load, the electrical load controller comprising: a line input terminal and a load output terminal, the line input terminal configured to be electrically coupled to the supply of electrical power, and the load output terminal configured to be electrically coupled to the load; a switching circuit electrically coupled in series between the line input terminal and the load output terminal, the switching circuit having an ON state in which the switching circuit conducts the supply of electrical power to the load, and an OFF state in which the switching circuit does not conduct the supply of electrical power to the load; and a microcontroller configured to perform: receiving, from an ambient light-sensing element in the environment, an ambient light value indicating a level of ambient light in the environment; receiving, from a sensor in an environment, a sensed environmental condition of the environment; determining a threshold value based on the received ambient light value; determining, based on the sensed environmental condition and the determined threshold value, whether to transition the switching circuit from the OFF state to the ON state; and performing processing based on the determining whether to transition the switching circuit from the OFF state to the ON state.

86. The electrical load controller of 85, wherein the determining the threshold value determines the threshold value as one selected from the group consisting of: a first value based on the received ambient light value indicating that ambient light in the environment is brighter than an ambient light threshold; and a second value, greater than the first value, based on the received ambient light value indicating that ambient light in the environment is darker than the ambient light threshold.

87. The electrical load controller of 85, wherein the determining the threshold value determines the threshold value as a continuous function of the received ambient light value.

88. The electrical load controller of 85, wherein based on the received ambient light value exceeding an ambient light threshold, the threshold indicates that the switching circuit is not to be automatically transitioned from the OFF state to the ON state.

89. The electrical load controller of 85, wherein the environmental condition is relative humidity and the sensed environmental condition is a current humidity value of the environment, wherein the threshold value is a threshold humidity value.

90. The electrical load controller of 89, wherein the determining the threshold humidity value comprises: determining a baseline humidity value based on at least one past humidity value received from a humidity sensor in the environment; and determining the threshold humidity value as a function of the baseline humidity value.

91. The electrical load controller of 90, wherein the method further comprises determining the threshold humidity value as a function of the baseline humidity value and a second humidity value greater than the baseline humidity value, wherein the function comprises a proportion of a difference between the baseline humidity value and the second humidity value.

92. The electrical load controller of 91, wherein the threshold humidity value is set equal to the baseline humidity value plus the proportion of the difference between the baseline humidity value and the second humidity value.

93. The electrical load controller of 90, wherein the at least one past humidity value comprises a dynamic collection of past humidity values received from the humidity sensor, wherein the dynamic collection of past humidity values changes based on passage of time and receipt of additional humidity values from the humidity sensor.

94. The electrical load controller of 93, wherein the determining the baseline humidity value determines an nth-minimum past humidity value of the dynamic collection of past humidity values, the nth-minimum past humidity value being the nth-lowest unique humidity indicated by the dynamic collection of past humidity values, wherein the determined baseline humidity value is taken as the determined nth-minimum.

95. The electrical load controller of 94, wherein n is greater than or equal to 2, in which there are n−1 lower unique humidities indicated by the dynamic collection of past humidity values.

96. The electrical load controller of 85, wherein the electrical load controller further comprises the ambient-light sensing element and the sensor.

97. The electrical load controller of 85, wherein the environmental condition is relative humidity and the sensed environmental condition is a current humidity value of the environment, and the threshold value is a threshold humidity value, and wherein the method further comprises: maintaining a dynamic collection of past humidity values received from a humidity sensor in the environment, wherein the dynamic collection of past humidity values changes based on passage of time and receipt of additional humidity values from the humidity sensor; determining a baseline humidity value based on identification of a lowest humidity value of the dynamic collection of past humidity values; wherein the determining whether to transition is further based on the determined baseline humidity value.

98. The electrical load controller of 85, wherein the environmental condition is relative humidity, the sensed environmental condition is a current humidity value of the environment, and the threshold value is a threshold humidity value, wherein the method further comprises determining a baseline humidity value based on at least one past humidity value received from a humidity sensor in the environment, and wherein the determined threshold humidity value is further based on the baseline humidity value and a second humidity value greater than the baseline humidity value.

99. The electrical load controller of 85, wherein the environmental condition is relative humidity, the sensed environmental condition is a current humidity value of the environment, and the threshold value is a threshold humidity value, wherein the method further comprises: maintaining a dynamic collection of past humidity values received from a humidity sensor in the environment, wherein the dynamic collection of past humidity values changes based on passage of time and receipt of additional humidity values from the humidity sensor; determining a baseline humidity value based on identification of a lowest humidity value of the dynamic collection of past humidity values; wherein the determined threshold humidity value is further based on the baseline humidity value and a second humidity value greater than the baseline humidity value.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method for controlling conduction of a supply of electrical power to a load, the method comprising:
    maintaining a dynamic collection of past humidity values received from a humidity sensor in the environment, wherein the dynamic collection of past humidity values changes based on passage of time and receipt of additional humidity values from the humidity sensor;
    determining a baseline humidity value based on identification of a lowest humidity value of the dynamic collection of past humidity values;
    receiving a current humidity value of the environment;
    determining, based on the current humidity value of the environment and the baseline humidity value, whether to transition a switching circuit from an OFF state, in which the switching circuit does not conduct the supply of electrical power to the load, to an ON state in which the switching circuit conducts the supply of electrical power to the load; and
    performing processing based on the determining whether to transition the switching circuit from the OFF state to the ON state.

2. The method of claim 1, wherein the determining the baseline humidity value determines an nth-minimum past humidity value of the dynamic collection of past humidity values, the nth-minimum past humidity value being the nth-lowest unique humidity indicated by the dynamic collection of past humidity values, wherein the determined baseline humidity value is taken as the determined nth-minimum.

3. The method of claim 1, wherein the determining the baseline value determines the baseline value as a function of n unique humidities indicated by the dynamic collection of past humidity values, wherein n>1.

4. The method of claim 3, wherein the n unique humidities are the n lowest unique humidities indicated by the dynamic collection of past humidity values, the n lowest comprising at least the lowest and second-lowest humidities indicated by the dynamic collection of past humidity values.

5. The method of claim 1, wherein the determining whether to transition from the OFF state to the ON state comprises comparing the current humidity value to a threshold humidity value.

6. The method of claim 5, wherein the threshold humidity value is dynamically set based on a difference between the baseline humidity value and a second humidity value greater than the baseline humidity value.

7. The method of claim 6, wherein the threshold humidity value is equal to the baseline humidity value plus a proportion of the difference between the baseline humidity value and the second humidity value.

8. The method of claim 1, wherein the dynamic collection of past humidity values comprises a set of most recently received past humidity values sensed by the humidity sensor in the environment.

9. The method of claim 8, wherein the set of most recently received past humidity values sensed by the humidity sensor includes one selected from the group consisting of:
(i) at most a predefined number of most recently received past humidity values to maintain in the dynamic collection; and
(ii) only past humidity values received within a defined window of time ending at a current time.

10. The method of claim 1, further comprising repeating the determining the baseline humidity value based on a change to the dynamic collection of past humidity values.

11. The method of claim 10, wherein the change comprises discarding from the dynamic collection of past humidity values a past humidity value equal to the baseline humidity value.

12. The method of claim 10, wherein the change comprises receiving for inclusion in the dynamic collection of past humidity values a next humidity value less than the baseline humidity value.

13. The method of claim 1, further comprising determining a threshold humidity value as a function of the baseline humidity value and a second humidity value greater than the baseline humidity value, wherein the determining whether to transition the switching circuit is further based on the determined threshold humidity value.

14. The method of claim 1, further comprising:
receiving, from an ambient light-sensing element in the environment, an ambient light value indicating a level of ambient light in the environment; and
determining a threshold humidity value based on the received ambient light value;
wherein the determining whether to transition the switching circuit is further based on the determined threshold humidity value.

15. The method of claim 1, further comprising:
receiving, from an ambient light-sensing element in the environment, an ambient light value indicating a level of ambient light in the environment; and
determining a threshold humidity value based on the received ambient light value, the baseline humidity value, and a second humidity value greater than the baseline humidity value;
wherein the determining whether to transition the switching circuit is further based on the determined threshold humidity value.

16. A method for controlling conduction of a supply of electrical power to a load, the method comprising:
determining a baseline humidity value based on at least one past humidity value received from a humidity sensor in the environment;
determining a threshold humidity value as a function of the baseline humidity value and a second humidity value greater than the baseline humidity value;
receiving a current humidity value of the environment;
determining, based on the current humidity value and the determined threshold humidity value, whether to transition a switching circuit from an OFF state, in which the switching circuit does not conduct the supply of electrical power to the load, to an ON state in which the switching circuit conducts the supply of electrical power to the load; and
performing processing based on the determining whether to transition the switching circuit from the OFF state to the ON state.

17. The method of claim 16, wherein the function comprises a proportion of a difference between the baseline humidity value and the second humidity value.

18. The method of claim 17, wherein the threshold humidity value is set equal to the baseline humidity value plus the proportion of the difference between the baseline humidity value and the second humidity value.

19. The method of claim 2, wherein the proportion is 50% such that the determined threshold humidity value is the midpoint between the baseline humidity value and the second humidity value.

20. The method of claim 17, wherein the at least one past humidity value comprises a dynamic collection of past humidity values received from the humidity sensor, wherein the dynamic collection of past humidity values changes based on passage of time and receipt of additional humidity values from the humidity sensor.

21. The method of claim 20, wherein the determining the baseline humidity value determines an nth-minimum past humidity value of the dynamic collection of past humidity values, the nth-minimum past humidity value being the nth-lowest unique humidity indicated by the dynamic collection of past humidity values, wherein the determined baseline humidity value is taken as the determined nth-minimum.

22. The method of claim 16, wherein the second humidity value is a saturation humidity of air in the environment.

23. The method of claim 22, wherein the saturation humidity is 100% relative humidity.

24. The method of claim 16, further comprising repeating the determining the threshold humidity value based on a change to the baseline humidity value.

25. The method of claim 16, further comprising maintaining a dynamic collection of past humidity values received from the humidity sensor, wherein the dynamic collection of past humidity values changes based on passage of time and receipt of additional humidity values from the humidity sensor, wherein the determining the baseline humidity value is based on identification of a lowest humidity value of the dynamic collection of past humidity values.

26. The method of claim 16, further comprising receiving, from an ambient light-sensing element in the environment, an ambient light value indicating a level of ambient light in the environment, wherein the determined threshold humidity value is further based on the received ambient light value.

27. The method of claim 16, further comprising:
maintaining a dynamic collection of past humidity values received from the humidity sensor, wherein the dynamic collection of past humidity values changes based on passage of time and receipt of additional humidity values from the humidity sensor, wherein the determining the baseline humidity value is based on identification of a lowest humidity value of the dynamic collection of past humidity values; and receiving, from an ambient light-sensing element in the environment, an ambient light value indicating a level of ambient light in the environment, wherein the determined threshold humidity value is further based on the received ambient light value.

28. A method for controlling conduction of a supply of electrical power to a load, the method comprising:

receiving, from an ambient light-sensing element in the environment, an ambient light value indicating a level of ambient light in the environment;

receiving, from a sensor in the environment, a sensed environmental condition of the environment, wherein the environmental condition is relative humidity and the sensed environmental condition is a current humidity value of the environment;

setting a threshold value based on the received ambient light value, wherein the threshold value is a threshold humidity value;

determining, based on the sensed environmental condition and the set threshold value, whether to transition a switching circuit from an OFF state, in which the switching circuit does not conduct the supply of electrical power to the load, to an ON state in which the switching circuit conducts the supply of electrical power to the load; and performing processing based on the determining whether to transition the switching circuit from the OFF state to the ON state.

29. The method of claim 28, wherein the setting the threshold value sets the threshold value to be one selected from the group consisting of:

a first value based on the received ambient light value indicating that ambient light in the environment is brighter than an ambient light threshold; and a second value, greater than the first value, based on the received ambient light value indicating that ambient light in the environment is darker than the ambient light threshold.

30. The method of claim 28, wherein the setting the threshold value sets the threshold value as a continuous function of the received ambient light value.

31. The method of claim 28, wherein based on the received ambient light value exceeding an ambient light threshold, the threshold indicates that the switching circuit is not to be automatically transitioned from the OFF state to the ON state.

32. The method of claim 28, wherein the setting the threshold humidity value comprises:

determining a baseline humidity value based on at least one past humidity value received from a humidity sensor in the environment; and setting the threshold humidity value as a function of the baseline humidity value.

33. The method of claim 32, further comprising setting the threshold humidity value as a function of the baseline humidity value and a second humidity value greater than the baseline humidity value, wherein the function comprises a proportion of a difference between the baseline humidity value and the second humidity value.

34. The method of claim 33, wherein the threshold humidity value is set equal to the baseline humidity value plus the proportion of the difference between the baseline humidity value and the second humidity value.

35. The method of claim 32, wherein the at least one past humidity value comprises a dynamic collection of past humidity values received from the humidity sensor, wherein the dynamic collection of past humidity values changes based on passage of time and receipt of additional humidity values from the humidity sensor.

36. The method of claim 35, wherein the determining the baseline humidity value determines an nth-minimum past humidity value of the dynamic collection of past humidity values, the nth-minimum past humidity value being the nth-lowest unique humidity indicated by the dynamic collection of past humidity values, wherein the determined baseline humidity value is taken as the determined nth-minimum.

37. The method of claim 28, further comprising:

maintaining a dynamic collection of past humidity values received from a humidity sensor in the environment, wherein the dynamic collection of past humidity values changes based on passage of time and receipt of additional humidity values from the humidity sensor;

determining a baseline humidity value based on identification of a lowest humidity value of the dynamic collection of past humidity values;

wherein the determining whether to transition is further based on the determined baseline humidity value.

38. The method of claim 28, further comprising determining a baseline humidity value based on at least one past humidity value received from a humidity sensor in the environment, and wherein the set threshold humidity value is further based on the baseline humidity value and a second humidity value greater than the baseline humidity value.

39. The method of claim 28, further comprising:

maintaining a dynamic collection of past humidity values received from a humidity sensor in the environment, wherein the dynamic collection of past humidity values changes based on passage of time and receipt of additional humidity values from the humidity sensor;

determining a baseline humidity value based on identification of a lowest humidity value of the dynamic collection of past humidity values;

wherein the set threshold humidity value is further based on the baseline humidity value and a second humidity value greater than the baseline humidity value.

* * * * *

UNITED STATES PATENT AND TRADEMARK OFFICE
CERTIFICATE OF CORRECTION

| | | |
|---|---|---|
| PATENT NO. | : 12,074,436 B2 | Page 1 of 1 |
| APPLICATION NO. | : 17/647359 | |
| DATED | : August 27, 2024 | |
| INVENTOR(S) | : Sanghvi et al. | |

It is certified that error appears in the above-identified patent and that said Letters Patent is hereby corrected as shown below:

In the Claims

Column 36, Line 23: Claim 19, Delete "claim 2" and insert -- claim 18 --

Signed and Sealed this
First Day of October, 2024

*Katherine Kelly Vidal*

Katherine Kelly Vidal
*Director of the United States Patent and Trademark Office*